(12) United States Patent
Hail et al.

(10) Patent No.: US 7,840,422 B1
(45) Date of Patent: Nov. 23, 2010

(54) SYSTEMS AND METHODS FOR MANAGING INSURANCE CLAIMS

(75) Inventors: Mitzi R. Hail, Louisville, KY (US); Berry L. Hayes, Sr., Louisville, KY (US); Thomas E. Taylor, Prospect, KY (US); William C. Moore, Louisville, KY (US); Bobby T. Tokuuke, Louisville, KY (US)

(73) Assignee: Trover Solutions, Inc., Louisville, KY (US)

( * ) Notice: Subject to any disclaimer, the term of this patent is extended or adjusted under 35 U.S.C. 154(b) by 1932 days.

(21) Appl. No.: 10/634,893

(22) Filed: Aug. 6, 2003

Related U.S. Application Data

(63) Continuation-in-part of application No. 10/118,060, filed on Apr. 9, 2002.

(60) Provisional application No. 60/410,828, filed on Sep. 16, 2002.

(51) Int. Cl.
*G06Q 10/00* (2006.01)

(52) U.S. Cl. .............................................. 705/4; 705/2

(58) Field of Classification Search ................. 705/2–4
See application file for complete search history.

(56) References Cited

U.S. PATENT DOCUMENTS

| | | | |
|---|---|---|---|
| 4,773,009 A | | 9/1988 | Kucera et al. |
| 4,868,750 A | | 9/1989 | Kucera et al. |
| 5,182,705 A | * | 1/1993 | Barr et al. .................. 705/11 |
| 5,442,780 A | | 8/1995 | Takanashi et al. |
| 5,504,674 A | | 4/1996 | Chen et al. |
| 5,550,734 A | * | 8/1996 | Tarter et al. .................. 705/2 |
| 5,583,758 A | * | 12/1996 | McIlroy et al. .............. 705/2 |
| 5,594,638 A | | 1/1997 | Iliff |
| 5,594,639 A | * | 1/1997 | Atsumi ........................ 700/107 |
| 5,666,492 A | * | 9/1997 | Rhodes et al. ................. 705/3 |
| 5,855,005 A | * | 12/1998 | Schuler et al. ................ 705/4 |
| 5,918,217 A | | 6/1999 | Maggioncalda et al. |
| 5,950,169 A | | 9/1999 | Borghesi et al. |
| 5,991,733 A | | 11/1999 | Aleia et al. |
| 6,049,773 A | | 4/2000 | McCormack et al. |
| 6,336,096 B1 | * | 1/2002 | Jernberg ....................... 705/4 |
| 6,810,382 B1 | * | 10/2004 | Wamsley et al. ............. 705/1 |
| 6,950,805 B2 | * | 9/2005 | Kavanaugh .................. 705/35 |

(Continued)

FOREIGN PATENT DOCUMENTS

AU    2001-89346 B2    5/2002

OTHER PUBLICATIONS

IRT Business This Week 2 (Fraud): Some insurance firms have paid bounties to beat fraud—Insurers say fraudulent claims cost them (pounds) 30 million last yea.*

(Continued)

*Primary Examiner*—Vivek D Koppikar
(74) *Attorney, Agent, or Firm*—Finnegan, Henderson, Farabow, Garrett & Dunner LLP

(57) ABSTRACT

Methods and systems for managing insurance claims include facilitating prepayment decisions, provider bill auditing, and recovery of paid claims. Prepayment decisions include, for example, determining whether to pay, deny, or defer an insurance claim submitted by an insured. Provider bill auditing may include, for example, examining bills related to an insurance claim for accuracy. Recovery of paid claims may include managing litigations and calculating fees due for recovery services.

14 Claims, 28 Drawing Sheets

U.S. PATENT DOCUMENTS

| | | | |
|---|---|---|---|
| 7,343,308 B1* | 3/2008 | Rojewski et al. | 705/4 |
| 2002/0035488 A1 | 3/2002 | Aquila et al. | |
| 2002/0035528 A1 | 3/2002 | Simpson et al. | |
| 2002/0087364 A1 | 7/2002 | Lerner et al. | |
| 2002/0177991 A1* | 11/2002 | Ejerhed | 704/2 |

OTHER PUBLICATIONS

Bowers, Barbara, "Bridging the great divide," Best's Review, vol. 100, No. 7, Nov. 1999, ISSN: 0161-7745, Dialog ID No.: 01957225 46498745, pp. 39-49.

USPTO Office Action mailed Oct. 12, 2006 in co-pending U.S. Appl. No. 10/118,060, 11 pgs.

USPTO Final Office Action mailed Apr. 2, 2007 in co-pending U.S. Appl. No. 10/118,060, 11 pgs.

USPTO Office Action mailed Nov. 5, 2007 in co-pending U.S. Appl. No. 10/118,060, 10 pgs.

USPTO Office Action mailed Apr. 24, 2008 in co-pending U.S. Appl. No. 10/118,060, 11 pgs.

USPTO Advisory Action mailed Sep. 19, 2008 in co-pending U.S. Appl. No. 10/118,060, 3 pgs.

USPTO Examiner's Answer mailed Nov. 28, 2008 in co-pending U.S. Appl. No. 10/118,060, 16 pgs.

* cited by examiner

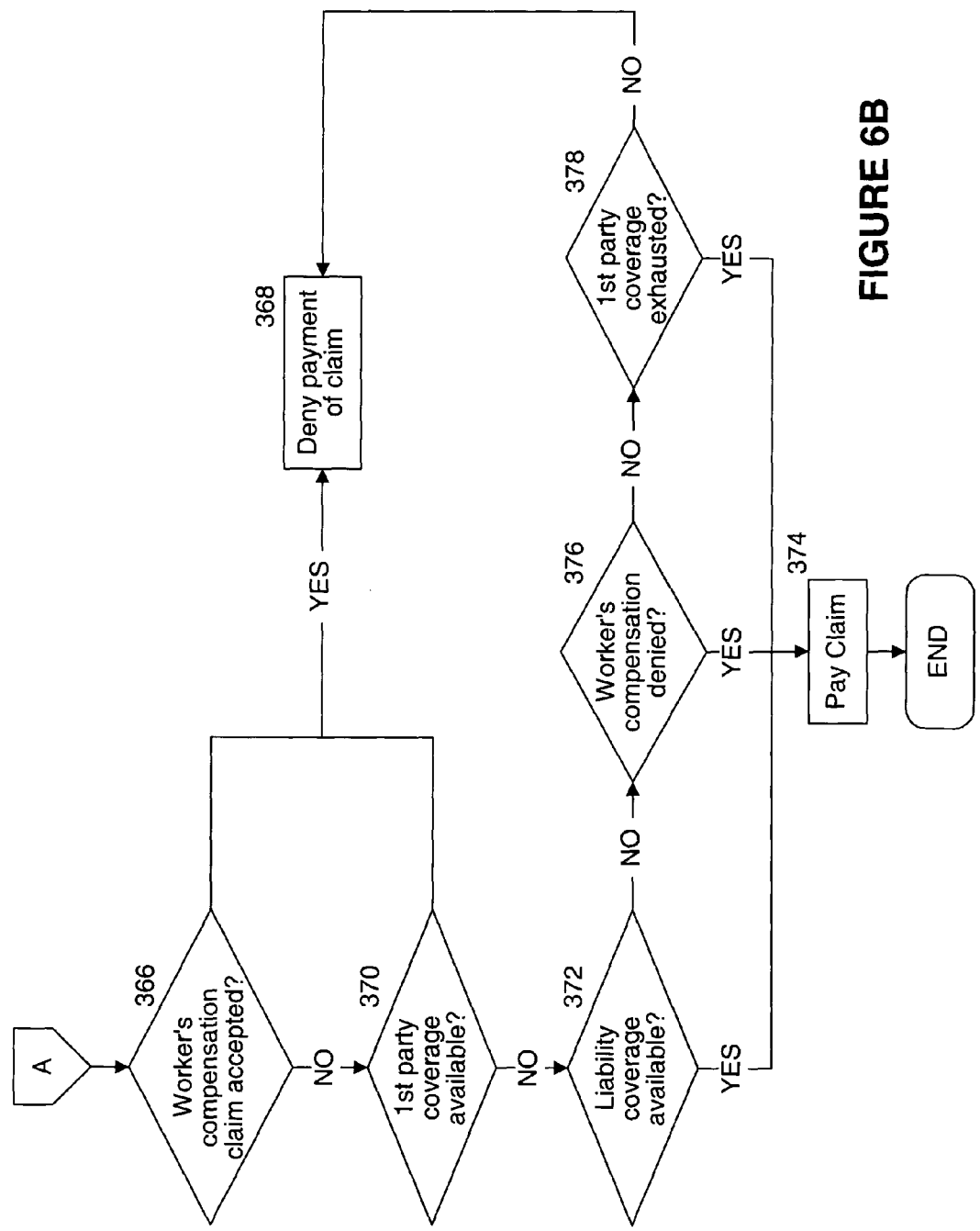

FIGURE 9

History — 404

Type of history

☑ Chief Complaint

History of Present Illness

Type of HPI    Time

Chronic Illnesses

Description

☑ Location
☑ Quality
☑ Severity
☑ Timing
☑ Duration
☑ Modifying Factors
☑ Context
☑ Assoc. Signs/Symptoms

Review of Systems — 410

Type of ROS

+  −
☐ ☑ Constitutional
☐ ☑ Eyes
☐ ☑ Ears/Nose/Mouth/Throat
☐ ☑ Cardiovascular
☐ ☑ Respiratory
☐ ☑ Gastrointestinal
☐ ☑ Geniourinary
☐ ☑ Musculoskeletal
☐ ☑ Integumentary
☐ ☑ Neurological
☐ ☑ Psychiatric
☐ ☑ Endocrine
☐ ☑ Hematologic/Lymphatic
☐ ☑ Allergic/Immunologic
☑ Documented, Remainder of Systems Negative Description Type of PFSH — 408

Past Medical History
☑ Past Illness
☑ Past Surgeries
☑ Allergies
☑ Current Medications
☑ Past Hospitalizations

Family History
☑ Familial Illness
☑ Hereditary Diseases

Social History
☑ Smoking
☑ Drug Use
☑ Living Arrangements
☑ Employment

SYSTEMS AND METHODS FOR MANAGING INSURANCE CLAIMS

RELATED APPLICATION

This application claims the benefit of U.S. Provisional Patent Application No. 60/410,828, filed Sep. 16, 2002, the disclosure of which is incorporated herein by reference. Furthermore, this application is a continuation-in-part of U.S. patent application Ser. No. 10/118,060, filed Apr. 9, 2002, the disclosure of which is incorporated herein by reference.

FIELD OF THE INVENTION

This invention relates to systems and methods for managing insurance claims and particularly to systems and methods for managing insurance claims using a computer.

BACKGROUND OF THE INVENTION

When an insured individual submits a claim to an insurance company for costs of treatment of an injury or repairs to damaged property, one of the first decisions the insurance company must make is whether to pay a claim. This determination involves many factors including the type and extent of policy coverage, applicable laws, and the factual circumstances surrounding the claim, such as the details of an injury and treatment. This decision is typically made on an ad hoc basis by an individual, nearly always erring on the side of payment of the claim because of penalties under applicable laws for failure to promptly pay most types of claims. Recovery of funds erroneously paid is difficult at best.

It is standard industry practice to audit some claims to determine whether a claimant seeks the correct amount of compensation for treatment of a particular injury. Selection of claims to audit is generally done on a random basis. This method of selection is not likely to choose those claims with the greatest potential for compensation errors.

Once a claim has been paid, an insured individual may be required, by the insurance policy, to subrogate their right to sue the third party that was responsible for the injury or property damage. Using the insured's subrogated rights, the insurance company then attempts to recover amounts it paid on the behalf of the insured from any third party responsible for the injury or damage. For instance, if an insured suffers a loss as a result of an auto accident caused by another party, the insured's insurance company may pay the insured's expenses related to the loss, but may later seek to recover the cost of the expenses from the responsible party or from the responsible party's insurance company. A system for managing many aspects of subrogation and recovery is described in U.S. patent application Ser. No. 10/118,060, filed Apr. 9, 2002, the entire contents of which are herein incorporated by reference.

The subrogation and recovery process involves many decisions and potential avenues of recovery. In some cases, recovery of paid claims is obtained by settlement, while in others, litigation is required to recover the amounts paid. In either case, the information gathered about the claim and the processing of the claim is affected by applicable laws. Additionally, recovery efforts, particularly litigation, can involve management of vast amounts of information and performance of various tasks at specified points within the process.

If recovery is received for a particular claim, the recovered amount may be subject to apportionment among various parties. For instance, if an amount is recovered by an outside recovery company acting on behalf of an insurance company, a contract between the outside recovery company and the insurance company may govern the amount of fees taken by the outside recovery company. Additionally, the recovered amount may be subject to local, state, and federal taxes.

Accordingly, the present invention provides systems and methods for managing insurance claims that overcome the deficiencies of known systems.

SUMMARY OF THE INVENTION

In accordance with an embodiment of the invention, a computer-implemented method is provided for managing insurance claims by receiving data related to an insurance claim via a network and calculating whether the insurance claim has recovery potential based on the received data. If it is calculated that the insurance claim has recovery potential, then a characteristic of the insurance claim is determined and automatically evaluated. A payment decision is established for the insurance claim based on at least one of the received data and the evaluation of the characteristic.

In accordance with another embodiment of the present invention, a method is provided for auditing insurance claims, comprising selecting an insurance claim, including a provider treatment code, for audit and assigning an auditor to audit the insurance claim. The auditor is automatically prompted to collect data related to the insurance claim and the collected data is received from the auditor. The auditor may select among a plurality of guidelines for calculating a proposed treatment code, which is calculated based on the collected data using the selected guideline and compared to the provider treatment code.

In accordance with yet another embodiment of the present invention, a method is provided for managing litigation related to an insurance claim, comprising receiving data about an insurance claim and automatically assigning the insurance claim to a litigation administrator when a litigation criteria is met by the received data. A budget is automatically established for the litigation administrator based on the received data and a user interface is provided for an auditor to determine at least one of the assigned litigation administrator, the established budget, and a status of the litigation. Further, a task for the litigation administrator may be automatically generated based on the received data.

In accordance with still another embodiment of the present invention, a method is provided for managing fees for the recovery of costs related to insurance claims. An agreement between a collector and a client is stored in a database when the client has paid costs corresponding to an insurance claim. Data about a recovery related to the costs corresponding to the insurance claim is received, the data including at least an amount recovered. Taxes due on the amount recovered and determined and a fee due to the collector is calculated based on at least one of the amount recovered and a fee schedule specified in the agreement.

Additional aspects of the invention will be set forth in part in the description which follows, and in part will be obvious from the description, or may be learned by practice of the invention. Many of the objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

FIGS. 6A-6B are flow charts of an investigation process according to an exemplary embodiment of the present invention;

FIGS. 8-15 are screen shots consistent with a provider bill audit module according to an exemplary embodiment of the present invention;

FIG. 16 is a screen shot of an attorney referral feature of a litigation manager according to an exemplary embodiment of the present invention;

FIGS. 17-18 are screen shots of task creation/update features according to an exemplary embodiment of the present invention;

FIG. 19 is a screen shot of a case review feature according to an exemplary embodiment of the present invention;

Figure 20:
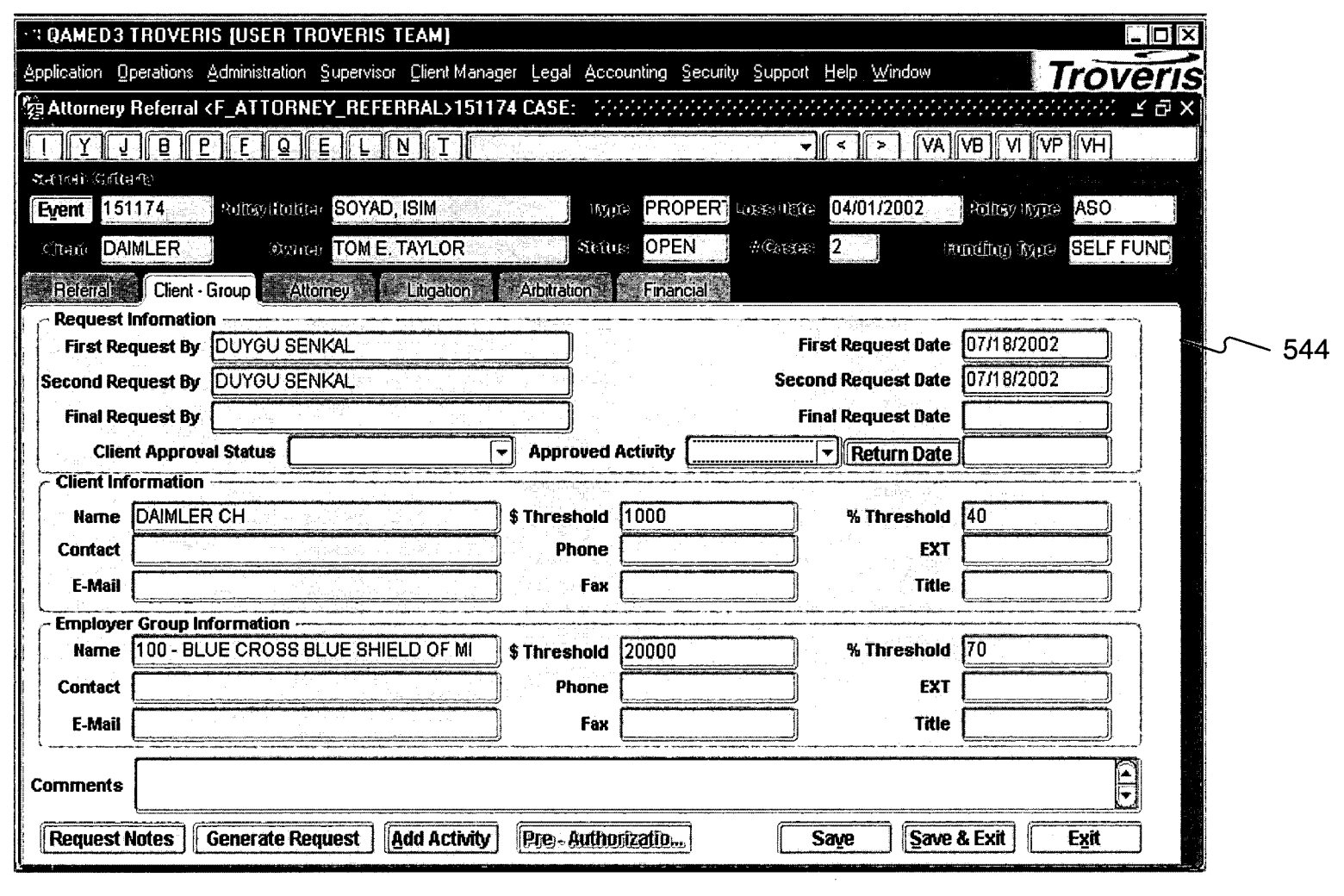

FIGS. 20-23 are screen shots of information organization features of a litigation manager according to an exemplary embodiment of the present invention;

FIGS. 25 and 26 are screen shots of a fees module according to an exemplary embodiment of the present invention.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

Systems consistent with the present invention manage various aspects of insurance claims. For example, systems consistent with the present invention may enable an insurance company or other entity to decide which insurance claims to pay, determine the accuracy of bills associated with insurance claims, or recover amounts associated with previously paid claims.

An exemplary embodiment of the present invention includes a system with components for facilitating prepayment decisions, provider bill auditing, and recovery of paid claims. Prepayment decisions may include, for example, determining whether to pay, deny, or defer an insurance claim submitted by an insured. Provider bill auditing may include, for example, examining bills related to an insurance claim for accuracy. Recovery of paid claims may include managing litigations and calculating fees due for recovery services.

Figure 1:
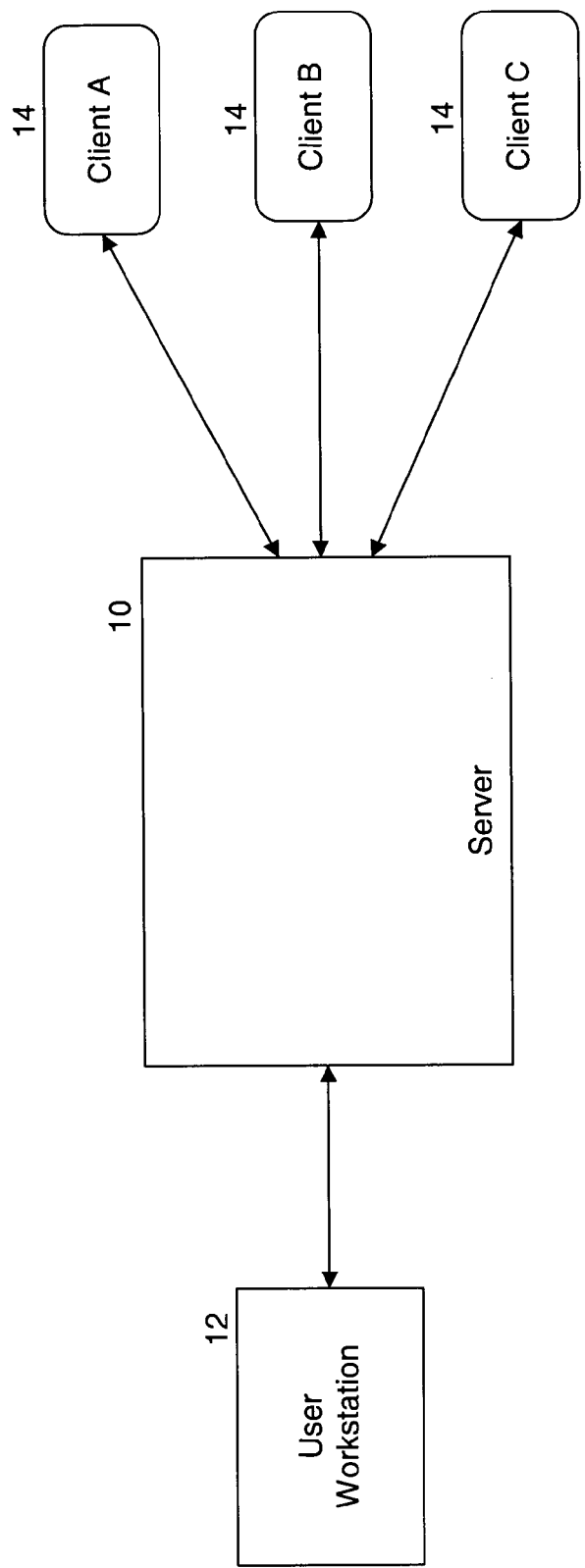
FIG. 1 is a block diagram of an exemplary embodiment of a network structure according to the present invention.

FIG. 1 is a block diagram of a system consistent with an embodiment of the present invention. A server 10 may be provided to perform one or more of the functions described above. Generally speaking, server 10 is formed by one or more data processing systems, such as computers, configured to perform functions and operations on behalf of, or in response to requests from, one or more clients, such as client 14.

Server 10 may be connected to one or more client computers 14 via any type of network, e.g., an intranet, the Internet, LAN, WAN, or a modem. Using the connection, server 10 may request, send, and receive data, such as data associated with insurance claims, from the one or more client computers 14. Server 10 may also be connected to one or more user workstations 12 for managing insurance claims via any type of network, e.g., an intranet, the Internet, LAN, WAN, or a modem. For example, server 10 may be provided by a service provider and user workstations 12 may enable employees of an insurance company, e.g., claims auditors, to manage insurance claims.

Figure 2:
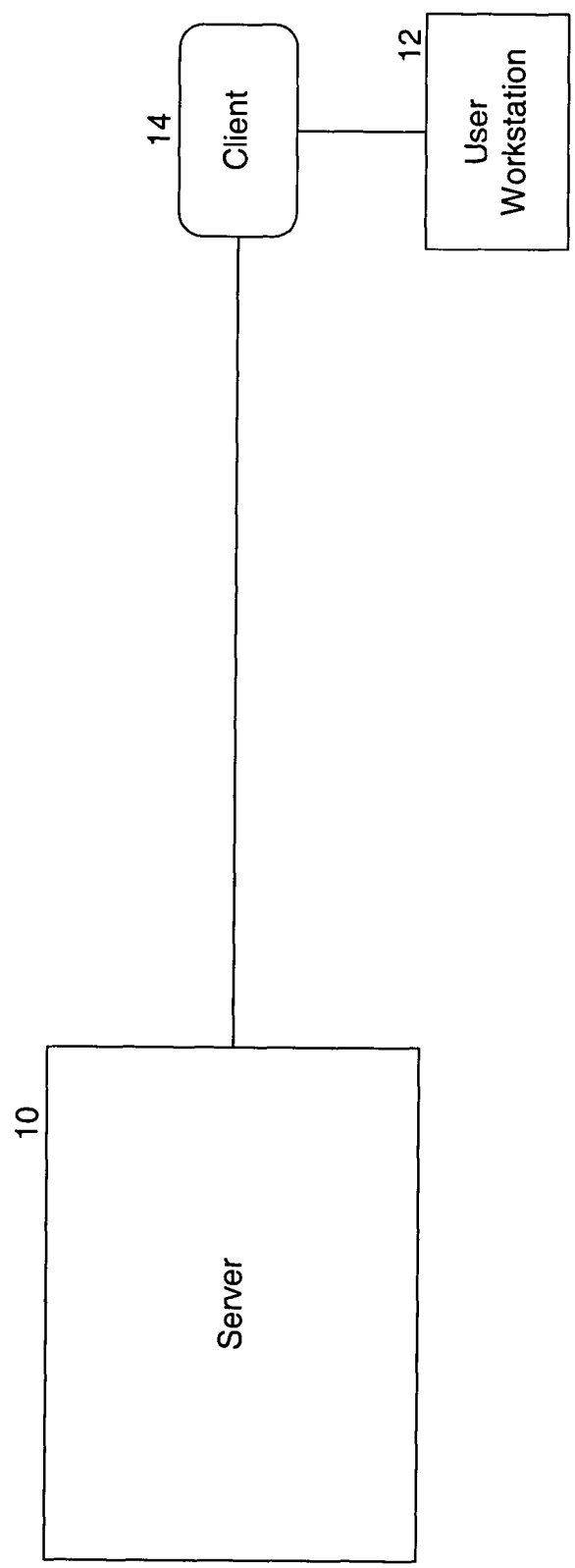
FIG. 2 is a block diagram of another exemplary embodiment of a network structure according to the present invention.

FIG. 2 is a block diagram of a system consistent with another embodiment of the present invention. In this embodiment, server 10 may be connected to one or more client computers 14 accessed by users, e.g., employees of an insurance company. The users may manage insurance claims at one or more workstations 12 connected to client computer 14 as shown in FIG. 2. Alternatively, workstations 12 may be connected to a network, such as the Internet, and may use web browsers to access server 10.

Figure 3:
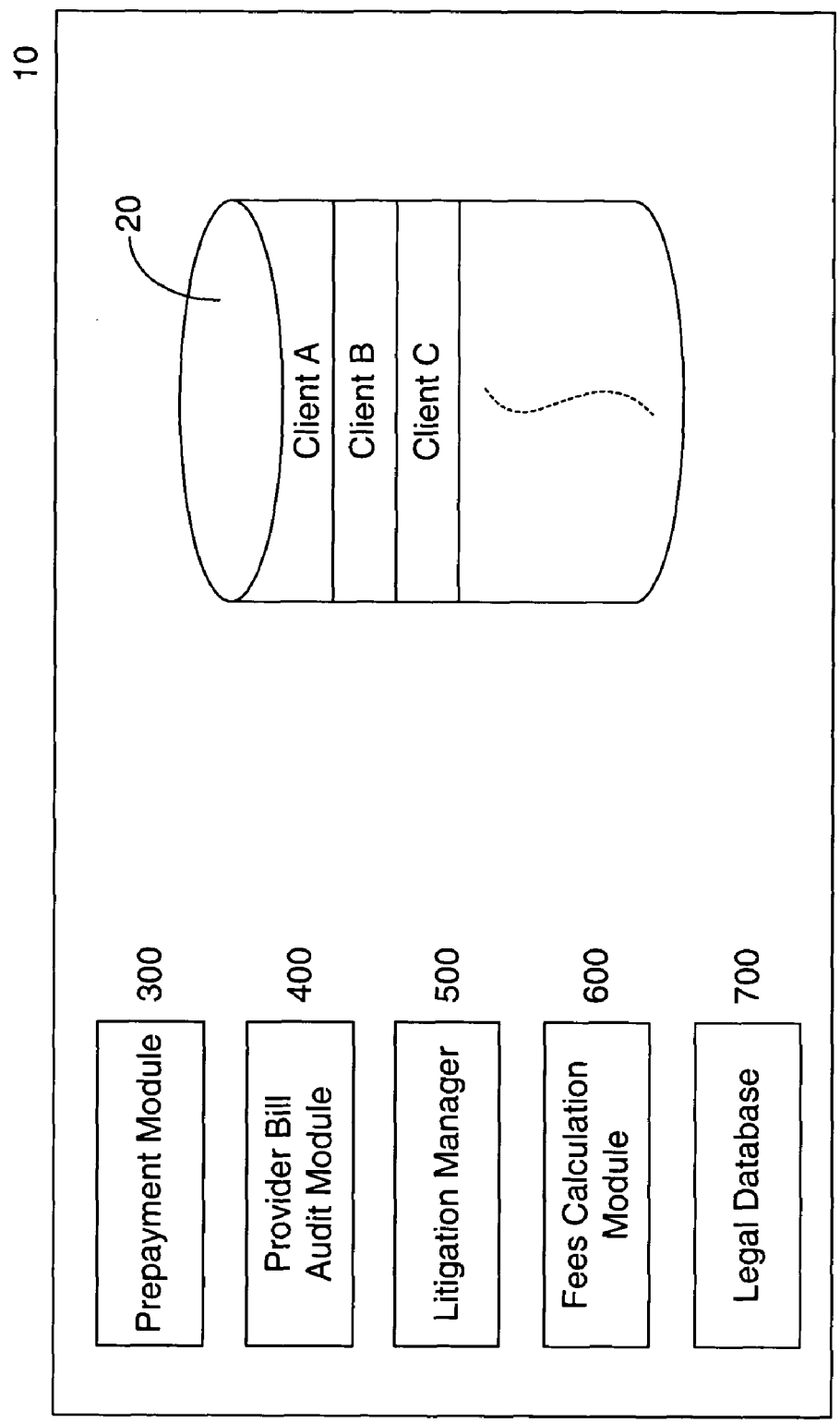
FIG. 3 is a block diagram of a server according to an exemplary embodiment of the present invention.

FIG. 3 is a block diagram of server 10 in greater detail. Server 10 may include, for example, a client database 20 for storing information in a computer memory related to one or more clients. For example, clients A, B, and C may be insurance company clients of a service provider running server 10. Client information may include, for example, insurance claim data, cases associated with a client, data arising from the processing of insurance claims associated with a client, data associated with cases for which recovery has been received, contract information including fee arrangements, and client preferences and parameters for processing insurance claims associated with the client. Alternatively, information related to each client may be stored in a separate database.

Server 10 may further include elements such as a prepayment module 300, provider bill audit module 400, litigation manager 500, fees calculation module 600, and legal database 700. Modules are formed of one or more computer programs configured to perform a set of operations. One or more computer associated with server 10 may, for example, execute computer programs of these modules. Prepayment module is described below with reference to FIGS. 4-6B. Provider bill audit module 400 is described below with reference to FIGS. 7-15. Litigation manager 500 is described below with reference to FIGS. 16-23. Fees calculation module 600 is described below with reference to FIGS. 24-26. Legal database 700 is described below with reference to FIG. 27. Consistent with the present invention, each module 300-700 may be resident on a separate computer or the modules may be combined, for example, in one or a few computers.

One skilled in the art will appreciate that server 10 may include one, all, or fewer than all of these modules consistent with the present invention. For example, a service provider may provide only prepayment services to one client, only fees calculation to a second client, and a combination of prepayment services and provider bill auditing to a third client. In another example, a service provider may provide only litigation management and server 10 may include only litigation manager 500.

Prepayment Module

When an insurance claim, based on a bill from a medical provider, is received by an insurance company, the insurance company must determine whether to pay the claim. The timing of this decision may be governed by various state and federal laws that require certain types of claims to be paid within a certain time period of receiving the claim. Failure to pay claims within the legally designated time can result in penalties. On the other hand, paying claims not covered by the insurance policy may result in significant losses to the insurance company because recovery of such erroneously paid funds can be extremely difficult. As a result, the decision of whether to pay a claim must be made quickly and accurately.

Figure 4:
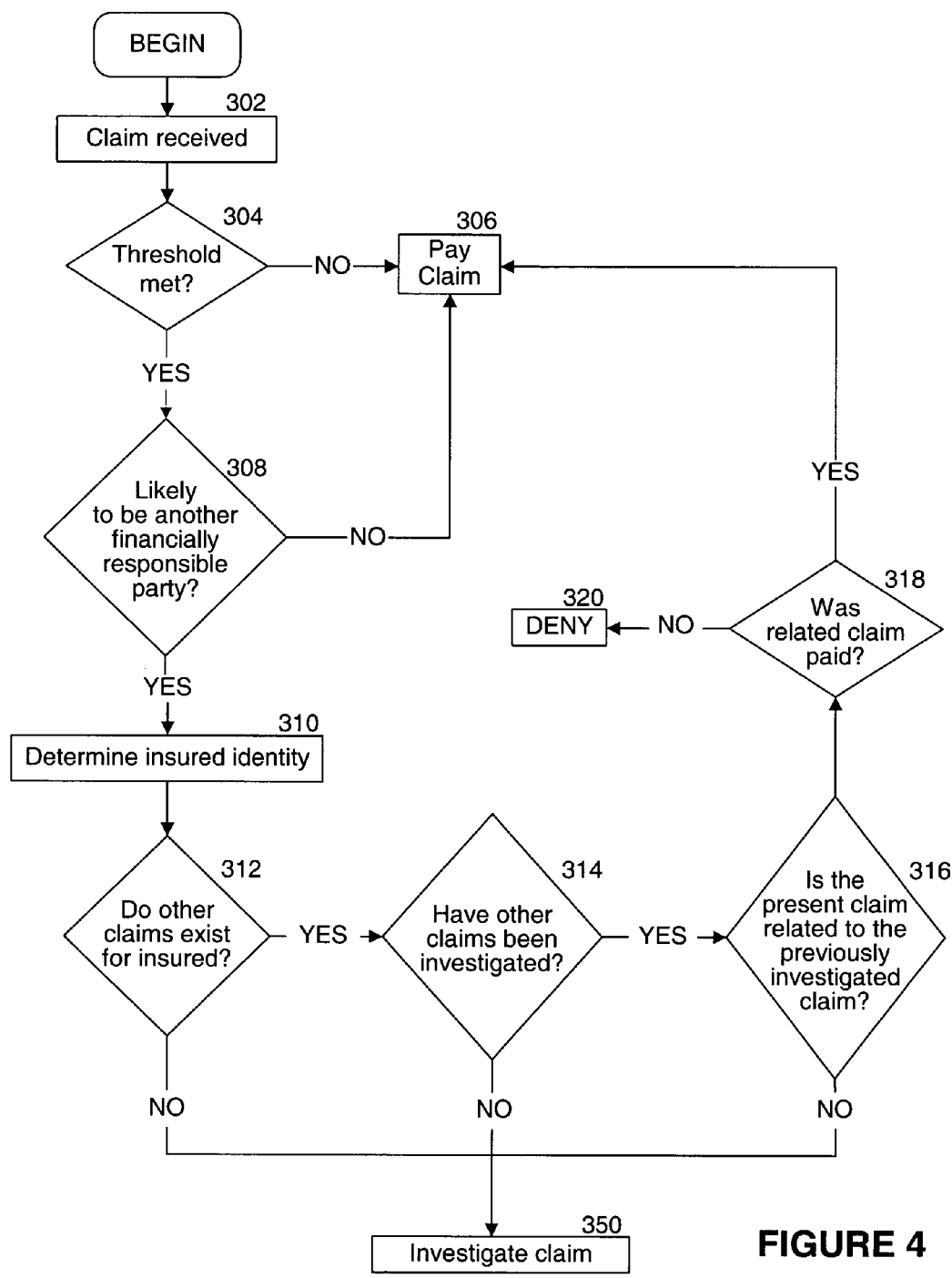
FIG. 4 is a flow chart of a process associated with a prepayment module according to an exemplary embodiment of the present invention.

FIG. 4 is a flow chart representing an overview of a process used by prepayment module 300 to determine whether to pay a claim. First, a new claim is received (step 302). The claim, for instance, may be associated with a bill from a medical provider for treatment of an injury sustained by an insured individual. The claim may contain various data and information, including an insured individual identifier, an injury or diagnosis type, such as an ICD-9 code, age of the injured person, date of injury, date of treatment, length of time from injury to treatment, jurisdiction in which the injury occurred, client, value of the claim, type of treatment such as a treatment code, the identity of the healthcare provider, etc. After receiving the new claim, prepayment module 300 determines whether the new claim meets a threshold dollar amount (step 304). The threshold amount may depend on a set of considerations including, for example, the type of injury. For example, the threshold may be $500 for back injuries and $300 for broken legs. If the threshold is not met (step 304 "NO"), the claim is simply paid (step 306). If the threshold is met (step 304 "YES"), a determination is made as to whether there is likely to be another financially responsible party (step 308).

Prepayment module 300 may apply an algorithm to portions of the data associated with the claim. The algorithm may consider, for example, portions of the claim data such as a diagnosis code, age at the time of the injury, and length of time between the injury and treatment to determine whether there is likely to be another financially responsible party. A particular weight may be assigned to each portion of the claim data to achieve a series of weighted values. The sum of the weighted values may be compared to a threshold value. If the sum of the resulting weighted values is over the threshold value, there is likely to be another financially responsible party. If the sum of the resulting weighted values is below the threshold value, there is not likely to be another financially responsible party.

The weight applied to a particular factor may be based on the value of that particular factor in claims that have already been processed successfully. Likewise, the threshold value may be based on the value of the sum of weighted values in claims that have been processed in the past. For example, an exemplary algorithm for trauma injuries may be:

$$(-1.317728)+(-0.000468\times(\text{age at time of injury})\times(\text{age at time of injury}))+(0.0330333\times(\text{age at time of injury}))+(1.12453577\times(\text{time between injury and treatment}))+(-0.3917884\times(\text{time between injury and treatment})\times(\text{time between injury and treatment}))=\text{sum of weighted values}.$$

If the sum of weighted values is less than −0.85, there is not likely to be another financially responsible party. One skilled in the art will appreciate that other suitable algorithms may be utilized.

If there is not likely to be another financially responsible party (step 308 "NO"), the claim is paid (step 306). If it is likely that there is another party financially responsible for the injury (step 308 "YES"), the identity of the insured is determined from the data associated with the new claim (step 310). Then, the client database may be searched to determine if the other claims exist for the insured individual (step 312). If no other claims exist (step 312 "NO"), payment of the new claim is delayed pending investigation (step 350). If other claims exist for the insured (step 312 "YES"), a determination may be made as to whether the existing claims for the insured have been investigated (step 314). If the existing claims have not been investigated (step 314 "NO"), the new claim may be investigated (step 350). If any of the existing claims have been investigated (step 314 "YES"), a determination may be made whether the new claim is related to any of the existing claims (step 316). If the new claim is not related to any existing claim for the insured (step 316 "NO"), the new claim is investigated (step 350). If the new claim is related to an existing claim (step 316 "YES"), prepayment module 300 may determine whether the related claim was paid (step 318). If the existing related claim was denied (step 318 "NO"), the new claim is likewise denied (step 320). If the existing related claim was paid (step 318 "YES"), the new claim is also paid (step 306).

In general, investigation process 350 may involve gathering information about a claim to determine whether the claim should be paid. An automated investigation system may facilitate investigation process 350. For example, a user making a phone call may be prompted by the automated investigation system to make the call at a particular time and given a script to gather necessary information. Specifically, when a claim enters the investigation stage, the automated investigation system may create a timeline and tasks to be completed by the system or a user, based on data associated with the claim, applicable laws, and other parameters. For instance, when a new claim is received, pursuant to the law of the state in which the injury occurred, the automated investigation system may prompt the user to make two attempts to contact the insured by telephone, say, within twenty-four hours of receiving the claim. If no response is received to the telephone contacts within the first twenty-four hours, the automated investigation system may generate and send, pursuant to state prompt-payment law, a delay of payment letter to the insured and the medical provider indicating that payment is delayed pending receipt of more information about the claim. If no response is received within a particular period of time (say, 10 days) determined based on, for example, state law, another attempt may be made to contact the insured. The user is prompted by the automated investigation system to make such a call. If no contact has been established by that point, state law may permit denial of payment. The automated investigation system may then deny payment by, for instance, generating letters to the insured and medical provider stating that the claim is denied.

After generating the timeline and list of tasks, the automated investigation system may carry out appropriate tasks and prompt specified users to perform user-required tasks. For instance, from the example described above, the automated investigation system may prompt the user to call the insured. When the user initiates the call, the automated investigation system may generate an interactive script for use by the user in gathering the necessary information. The script is created in consideration of information associated with the claim, applicable laws, and historical data relating to similar claim types. For example, the automated investigation system may determine the jurisdiction of interest from the claim data indicating the location where the injury occurred. This information may be used to determine which laws will apply. The laws of various localities may require investigation and payment or denial of a claim within a certain time period. Additionally, the automated investigation system may determine the type of injury and/or treatment by considering the insured's response to the letter requesting details and circumstances surrounding the injury and specified criteria such as injury type, age of the injured person, date of injury, date of treatment, length of time from injury to treatment, recovery source, jurisdiction in which the injury occurred, client, value of the first insurance claim, and type of treatment.

Figure 5:
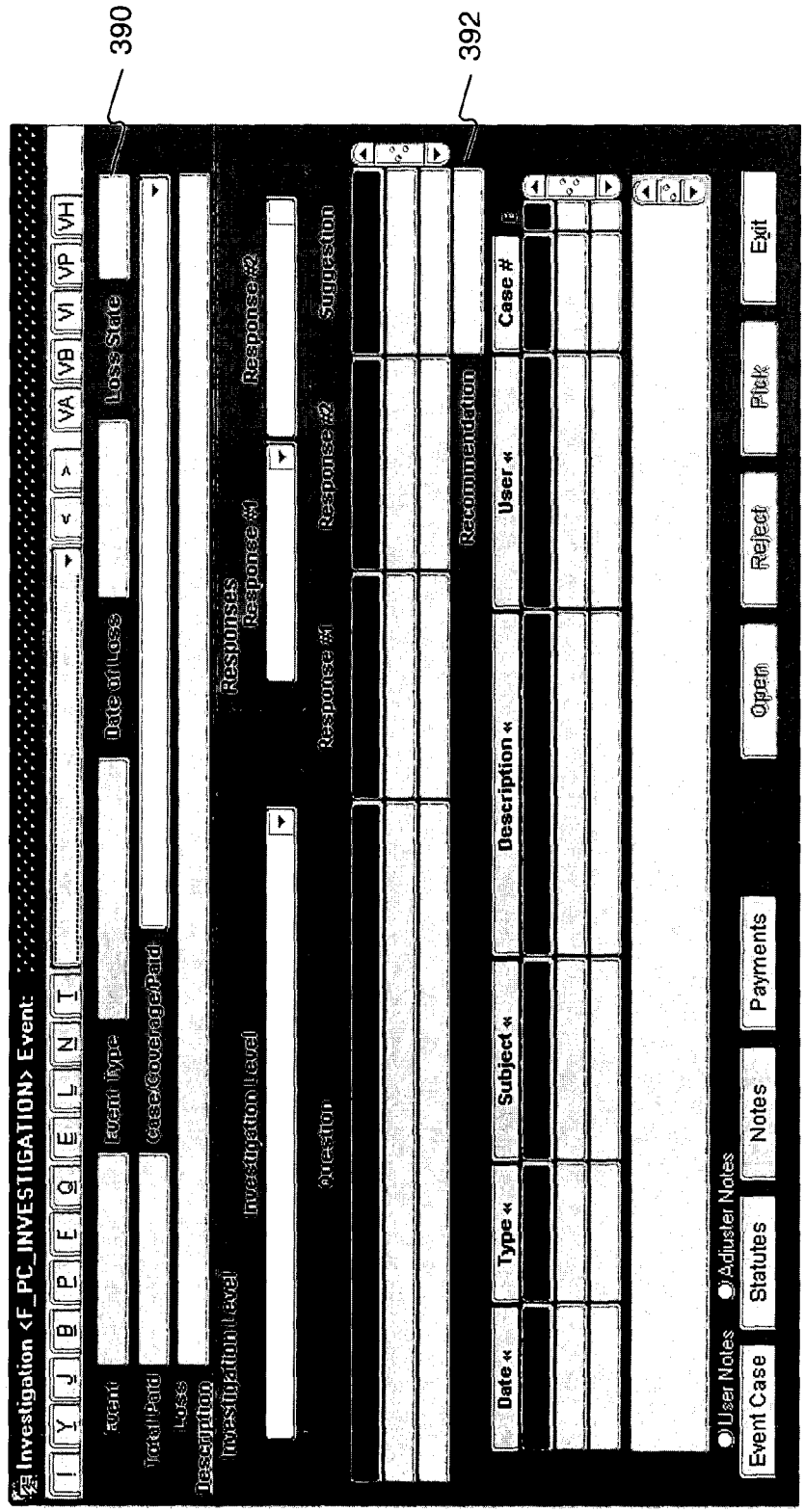
FIG. 5 is a screen shot of an investigation template according to an exemplary embodiment of the present invention.

FIG. 5 is a screen shot of a blank investigation template in accordance with the present invention. The upper portion 390 of the screen shot shows entry fields for information describing the claim, such as the total paid and a description of the loss. The lower portion 392 of the screen shot includes display and entry fields related to the investigation process. For instance, FIG. 5 shows a display field labeled "Question". This field may display questions for a user to ask during a telephone call to an insured individual or other person. It also includes fields for entering responses to each question. The automated investigation system may display questions based on responses to prior questions.

Figure 6A:
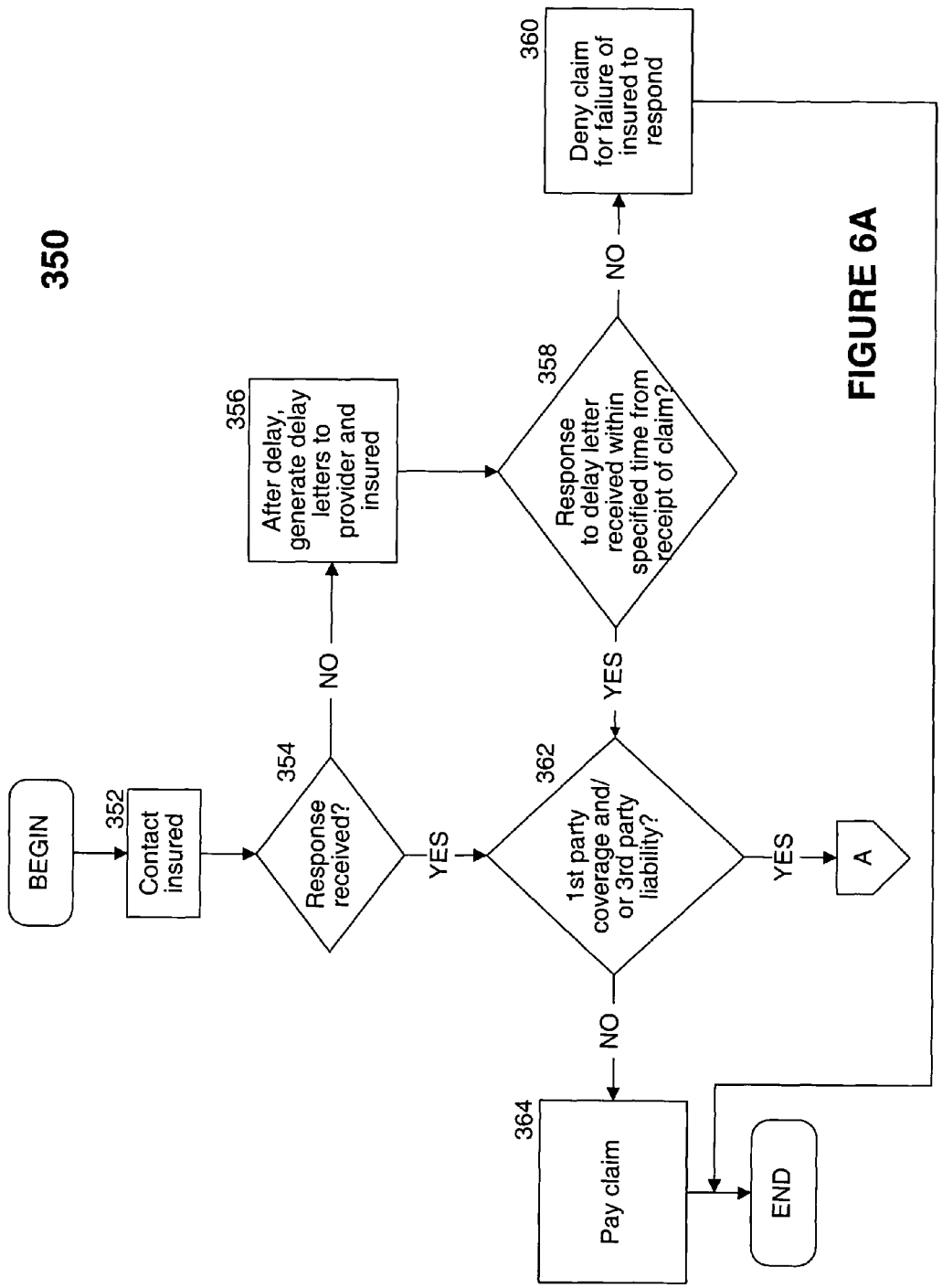

FIGS. 6A and 6B are flow charts of an investigation process 350 according to an exemplary embodiment of the present invention. First, attempts to contact the insured are made (step 352). The initial contact is generally by phone. Two attempts to contact by phone are generally made within twenty-four hours of receiving the claim. The automated investigation system then determines whether a response was received (step 354). If no response is received within the specified period of time, generally the first twenty-four hours following receipt of the claim, the system generates delay letters to the medical provider and the insured individual (step 356). The letters generally explain that payment of the claim has been delayed until a response is received from the insured. After a specified delay, for example, fifteen days from the receipt of the claim, the system determines whether a response to the delay letter has been received (step 358). If no response to the delay letter has been received within the specified time, the claim is denied for failure of the insured to respond (step 360). If a response is received to either the initial attempts to contact the insured by phone or the delay letters, a determination is made as to whether there is first party coverage and/or third party liability (step 362). If there is no first party coverage available and if there is no third party liability, the claim is paid (step 364).

If there is first party coverage available and/or third party liability, the automated investigation system determines whether a worker's compensation claim has been accepted by a primary carrier (step 366). If so, the claim is denied (step 368). If no worker's compensation claim has been accepted, the system determines whether first party insurance coverage is available to cover the costs of the claim (step 370). If so, the claim is denied (step 368). If no first party coverage is available, a determination is made whether liability coverage of some type is available (step 372). If so, the claim is paid (step 374). If no liability coverage is available, a determination is made whether a worker's compensation claim has been denied (step 376). If such a claim was denied, the claim is paid (step 374). If there is no denial of a workers compensation claim, a determination of whether any existing first party coverage is exhausted is made (step 378). If so, the claim is paid (step 374). If not, the claim is denied (step 368).

Provider Bill Audit Module

Systems consistent with the present invention may include a provider bill audit module that allows a user to verify that a claimant seeks the correct amount of compensation. The provider bill audit module may be utilized at any point during or after the processing of a claim. For example, the feature may be used in the prepayment context to determine whether to pay the full amount requested by a claim. Alternatively or additionally, the provider bill audit module may be used during the post-payment/subrogation process. Further, the provider bill audit feature may be used on claims that have been managed in the past to evaluate the billing practices of certain providers.

Each medical insurance claim generally includes one or more medical procedure or treatment codes, such as CPT-4 codes, that explain the type of treatment a patient received from a medical provider. The amount paid to the provider depends on the procedure codes submitted in the claim. It is standard industry practice to audit some claims to insure that the medical provider submitted the correct procedure code for the treatment given. If incorrect procedure codes are used, the provider may be entitled to additional compensation for the treatment or the provider may be denied part of the compensation if the procedure code in the claim seeks more compensation than the provider is entitled to.

Figure 7:
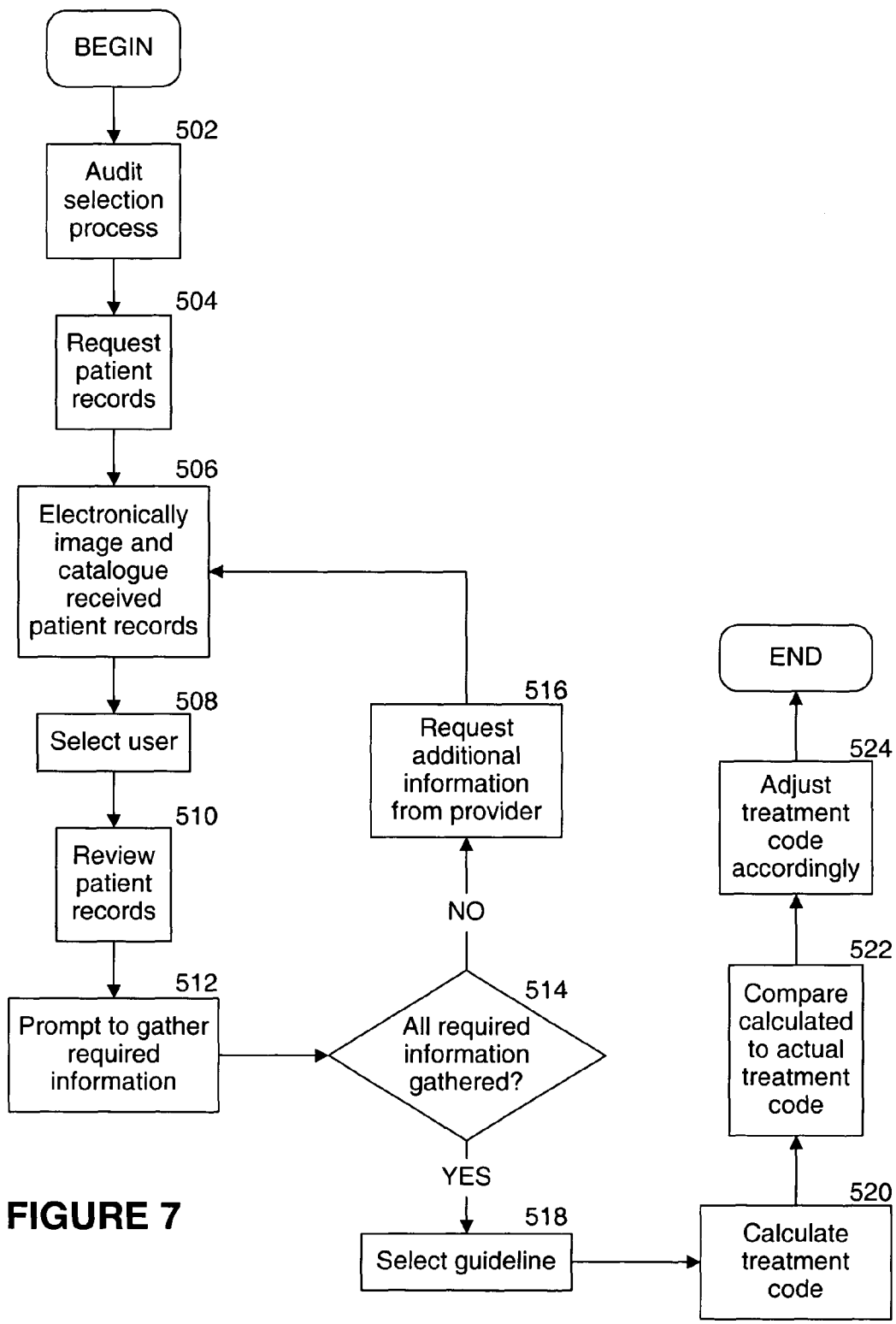
FIG. 7 is a flow chart of processing performed by a provider bill audit module according to an exemplary embodiment of the present invention.

FIG. 7 is a flow chart of processing performed by provider bill audit module 400 according to an exemplary embodiment of the present invention. All claims are first subject to an audit selection process (step 502). As described in step 502, systems consistent with the present invention allow claims to be selected for audit that are likely to have incorrect procedure codes. The audit selection process may consider the data associated with the claim and statistical information from past claims. For instance, provider bill audit module 400 may compare the level of procedure codes within a claim to diagnosis codes within the claim, such as ICD-9 codes. It may also consider whether the provider listed in the claim has had claims audited in the past, the result of any such audits, the distribution of procedure codes for the provider, the applicable medical specialty, and national averages to determine if the claim is within the normal statistical distribution. A claim with one or more procedure codes outside any of those distributions may indicate an erroneous procedure code. Additionally, a provider bill audit module 400 may consider the relationship between other procedure codes in the same or related claims. In particular, provider bill audit module 400 may include tables of treatments that are grouped together or occur in a particular order. For example, a grouping of treatments related to broken arms may include setting the bone, casting the arm, removing the cast, and rehabilitation. If each of those treatment codes appeared in a single claim, along with a treatment code for eye surgery, the system may select the claim for audit because the treatment code for eye surgery is not typically grouped with the other treatment codes relating to a broken arm.

After claims are selected for audit, provider bill audit module 400 requests patient records from the medical provider listed in the claim (step 504). Provider bill audit module 400 may generate the patient records request, for example, in email, fax, or paper form. Once the records are received, they may be electronically imaged and catalogued (step 506). Provider bill audit module 400 then selects a user to audit the claim (step 508). The selection may be based on a user's expertise and experience and the type of claim and treatment as indicated by the claim data such as provider and treatment code. For instance, a claim with treatment codes related to a broken arm may be assigned to a user with experience and expertise in orthopedics. The information about the injury type may be derived from the treatment codes in the claim. The expertise and experience of the user may be designated in and maintained in a user profile for each user.

The selected user is prompted to review the patient records (step 510). To assist the selected user in reviewing the patient records, provider bill audit module 400 prompts the user to search the records for various required information and enter the information into a template described in detail below with reference to FIGS. 9-16 (step 512). Provider bill audit module 400 determines whether all required information has been gathered (step 514). If not, and the user indicates that such information is not within the patient records, provider bill audit module 400 may prompt the user to request additional information from the medical provider (step 516). Alternatively, provider bill audit module 400 may automatically generate a request to the medical provider by email, fax, or in paper form. If all required information has been acquired, provider bill audit module 400 selects a guideline for determining an appropriate treatment code (step 518). Though the calculation of a treatment code is a known process, several different guidelines or formulas (e.g., Medicare guidelines) may be used in calculating such codes. The present system assists the user in selecting which guideline will be used to calculate the treatment code (step 520). After a treatment code has been calculated, it is compared to the actual treatment code submitted with the claim (step 522). Appropriate adjustments can then be made to the procedure code in the claim (step 524). For example, if the procedure code submitted by the provider is for a compensation level higher than the calculated code, the system may downgrade the treatment code. Compensation for the claim is then based on the downgraded treatment code.

Figure 8:
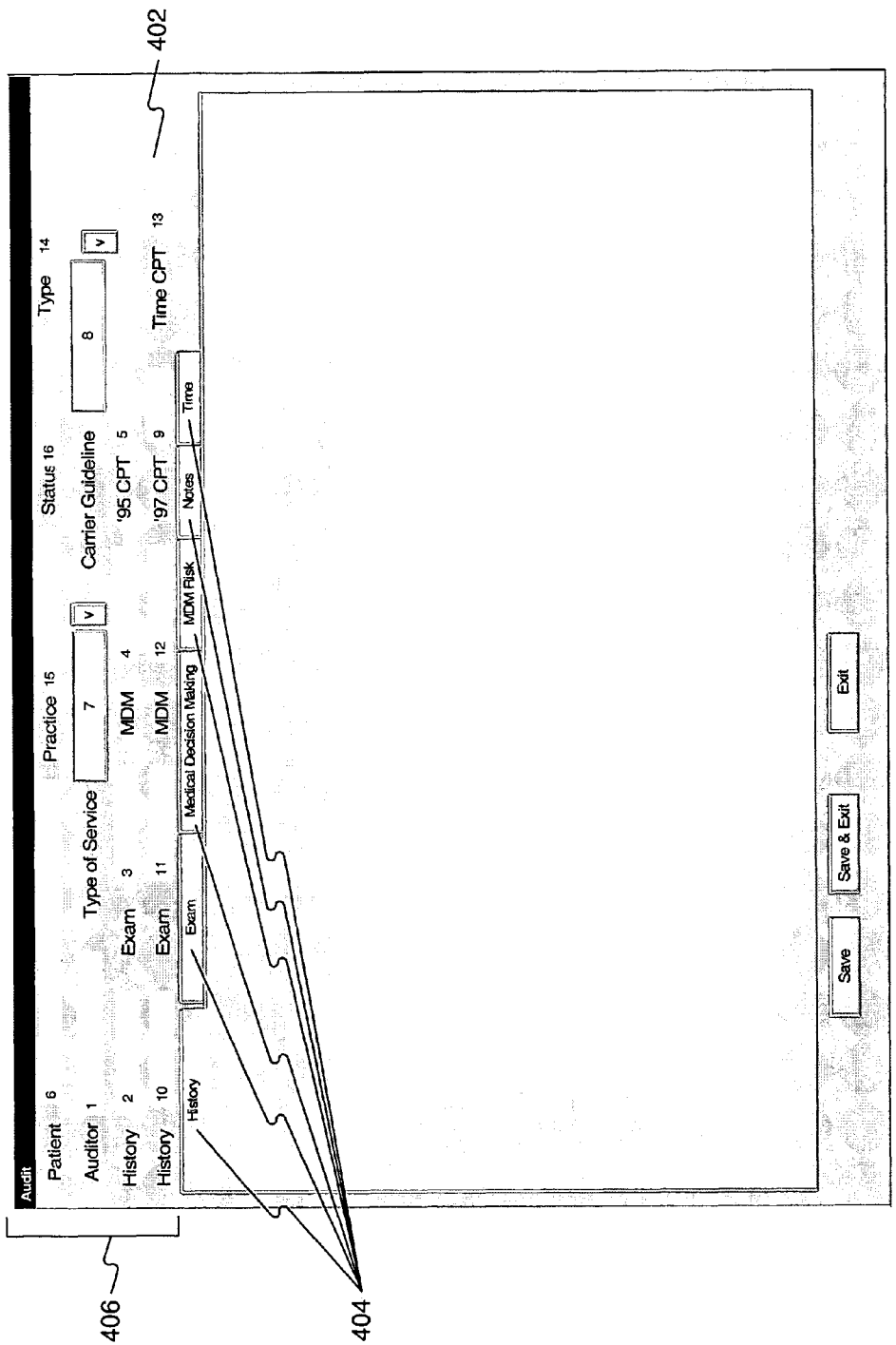

FIGS. 8-15 are screen shots consistent with a provider bill audit module according to an exemplary embodiment the present invention. FIG. 8 shows the main audit screen 402, including tabs 404 labeled History, Exam, Medical Decision Making, MDM Risk, Notes, and Time. The tabs allow a user to navigate to the different sections of the audit and review/add/update the details in that section as appropriate. The upper portion 406 of the screen shot in FIG. 8 contains basic information about a claim such as the patient, the auditor, the guideline that will be used to calculate the procedure code, and the medical provider. A screen such as the one shown in FIG. 9 may be used, for example, to review patient records (step 510).

FIGS. 9-15 are screen shots associated with the tabs on the main audit screen shown in FIG. 8. Each screen contains entry fields for specific information that a user may extract from the patient records. FIG. 9 shows a screen shot of the screen accessed by selecting the "History" tab from the main audit screen shown in FIG. 8. The screen shown in FIG. 9 contains entry and display fields 408 for documenting the history of the illness or injury to which the claim relates as well as the past medical history of the patient. There are also fields 410 for selecting and providing a description of symptoms reported by the patient.

Figure 10:
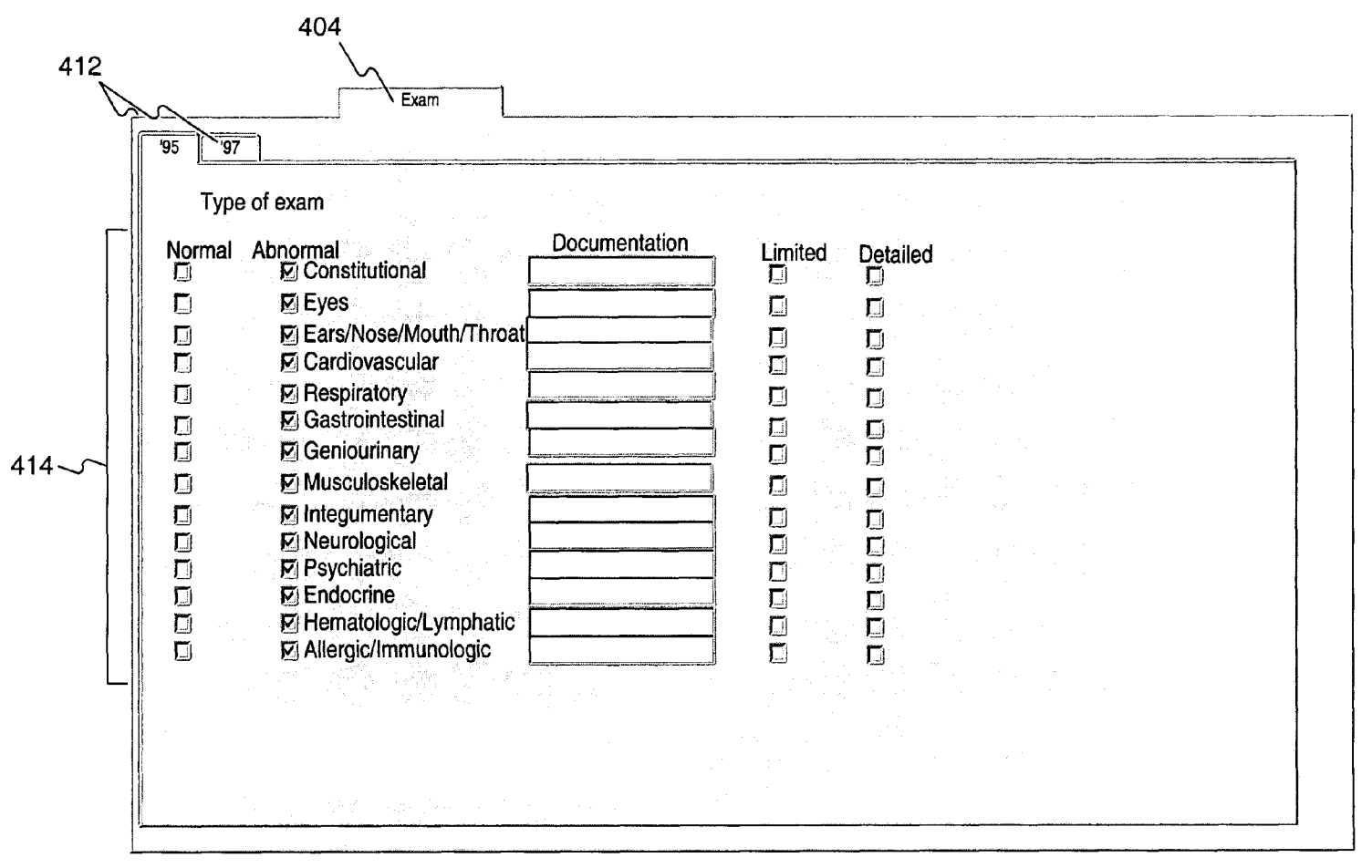
Figure 11:
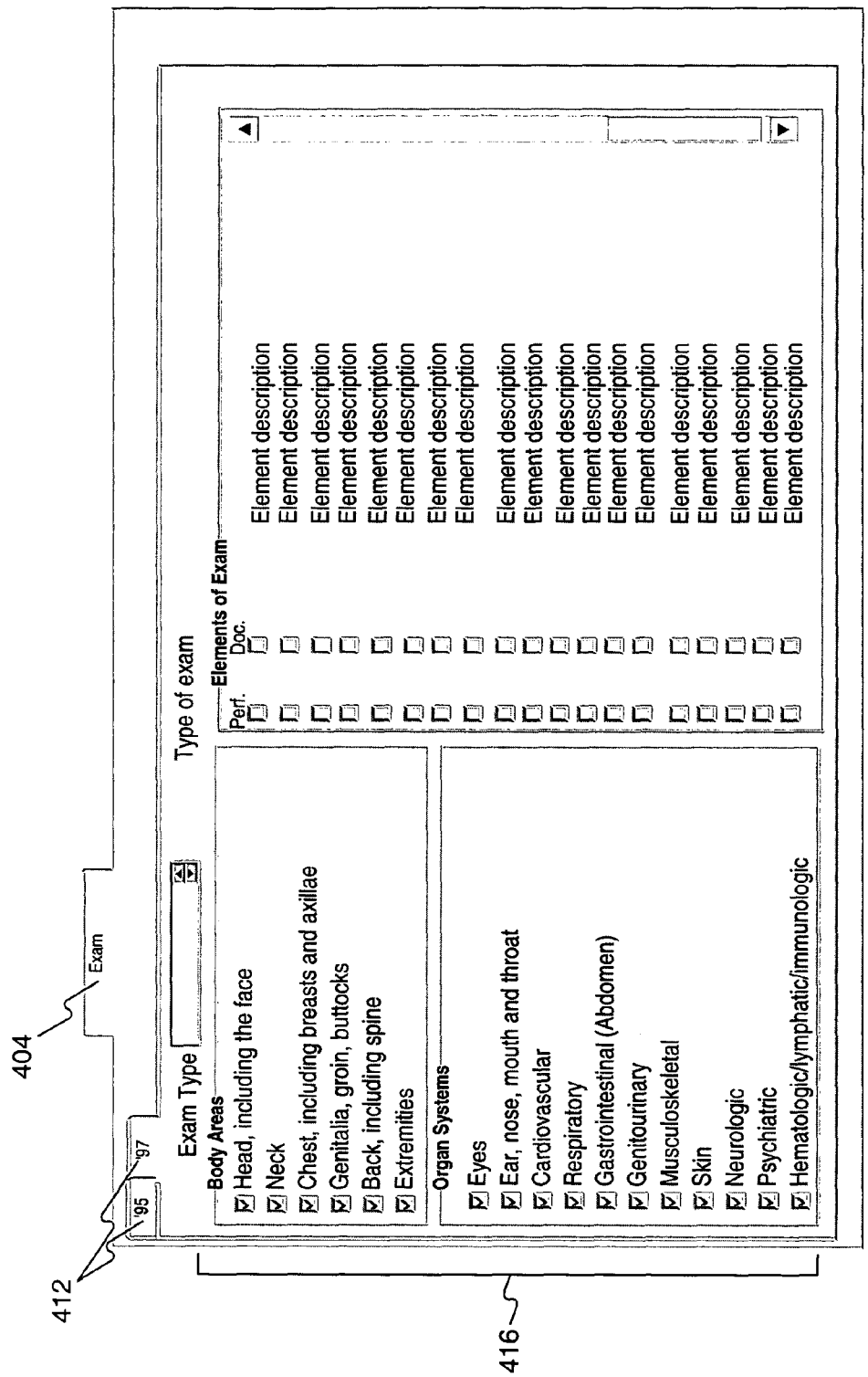

FIGS. 10 and 11 show features accessible from the main audit screen shown in FIG. 8 by selecting the "Exam" tab. The exam tab 404 has two sub-tabs 412 for accessing screens labeled "'95" (FIG. 10) and "'97" (FIG. 11). FIG. 10 contains entry fields 414 for information required to document an audit conforming to the 1995 CMS (HCFA) guideline. FIG. 11 contains entry fields 416 for information required to document an audit conforming to the 1997 CMS (HCFA) guideline. One skilled in the art will recognize that other sub-tabs may be used based on other guidelines for regulations.

Figure 12:
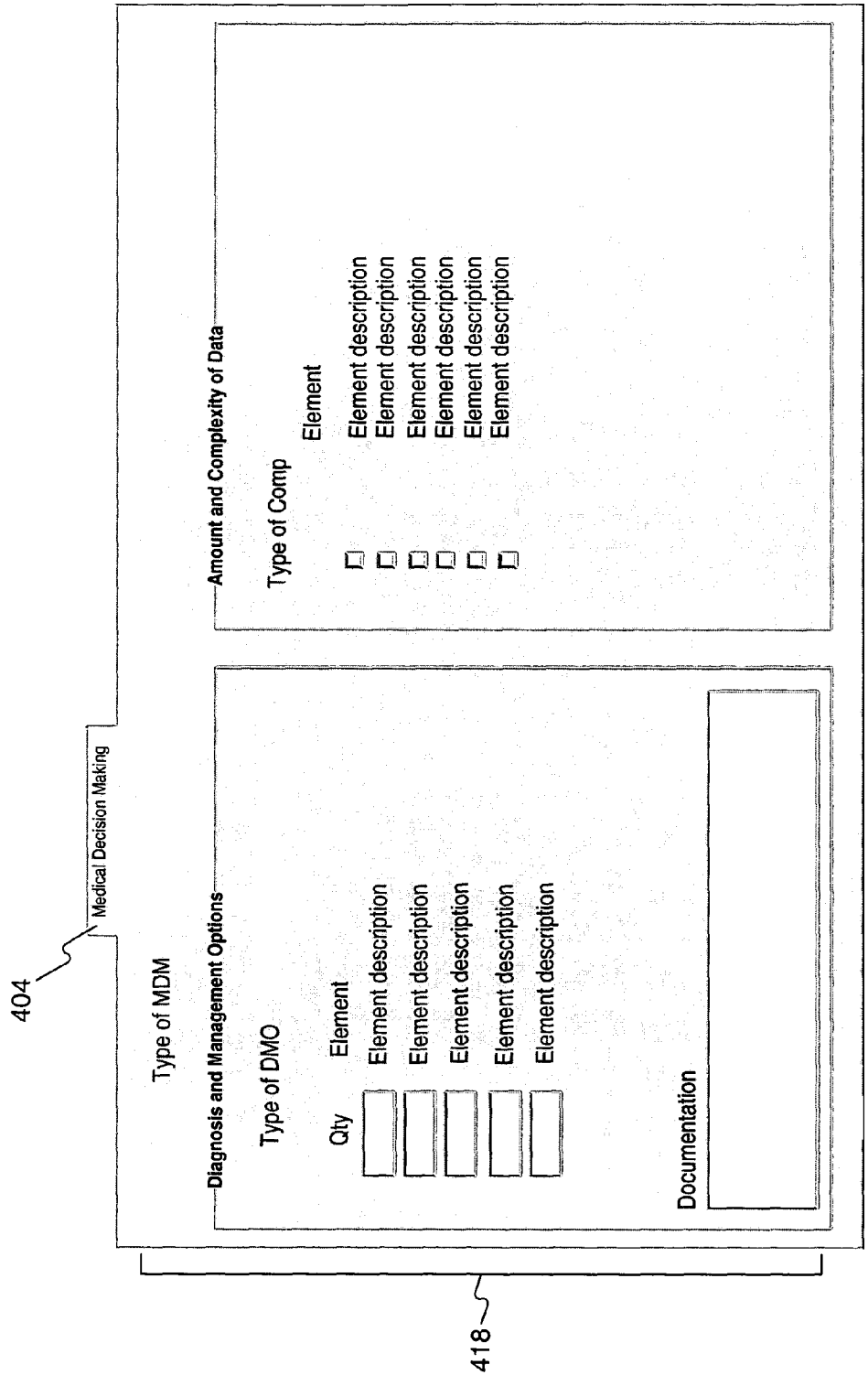
Figure 13:
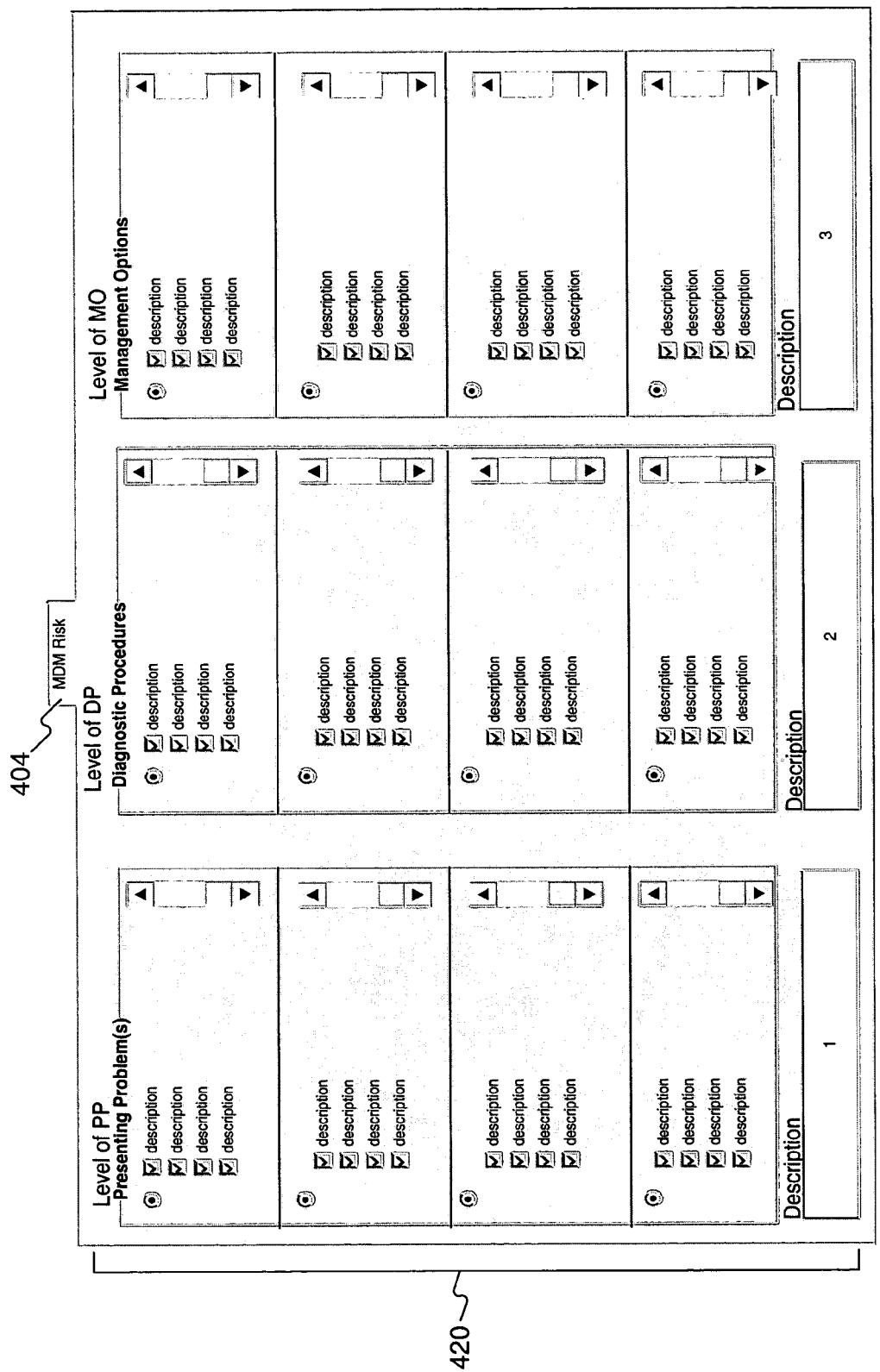
Figure 14:
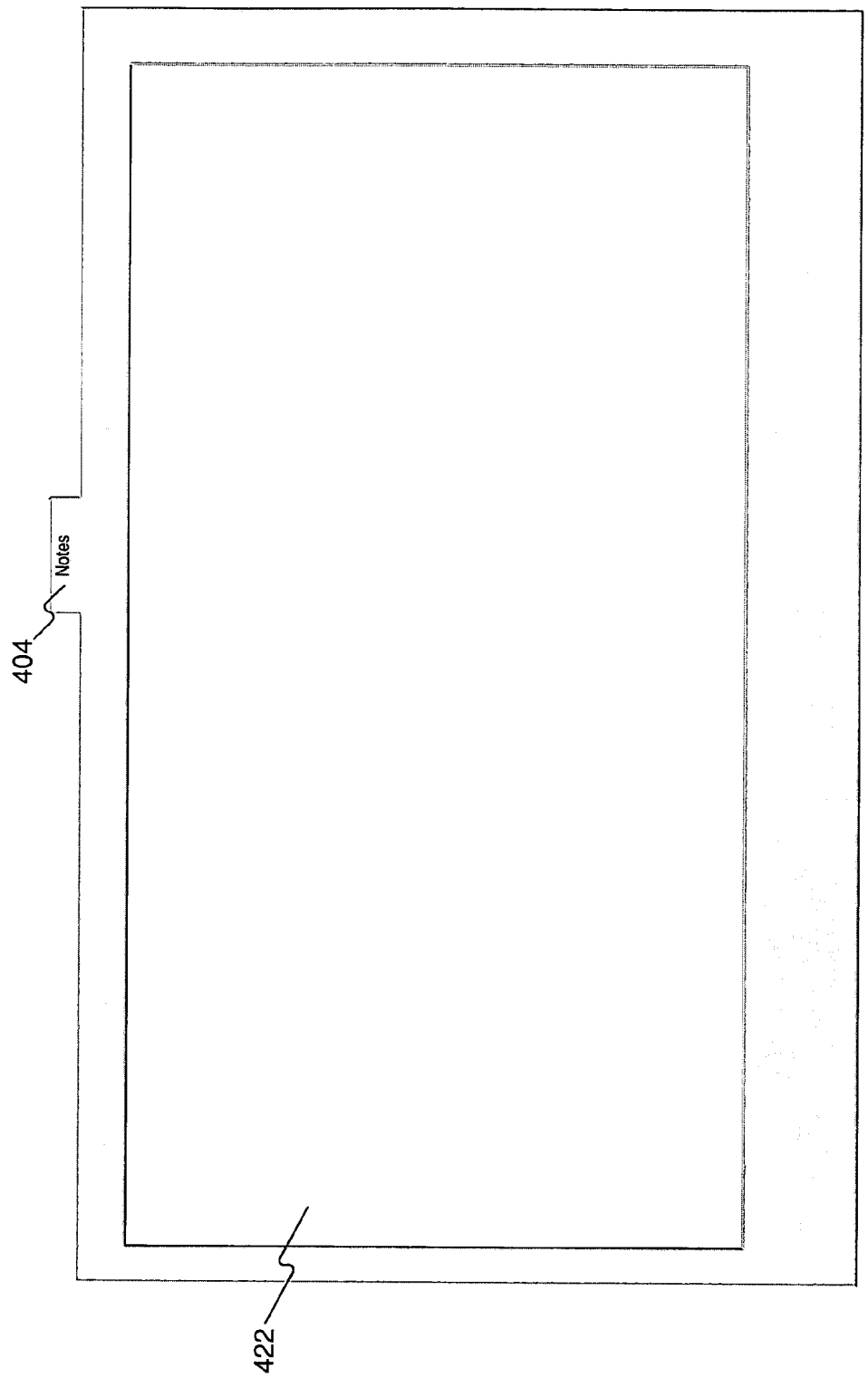
Figure 15:
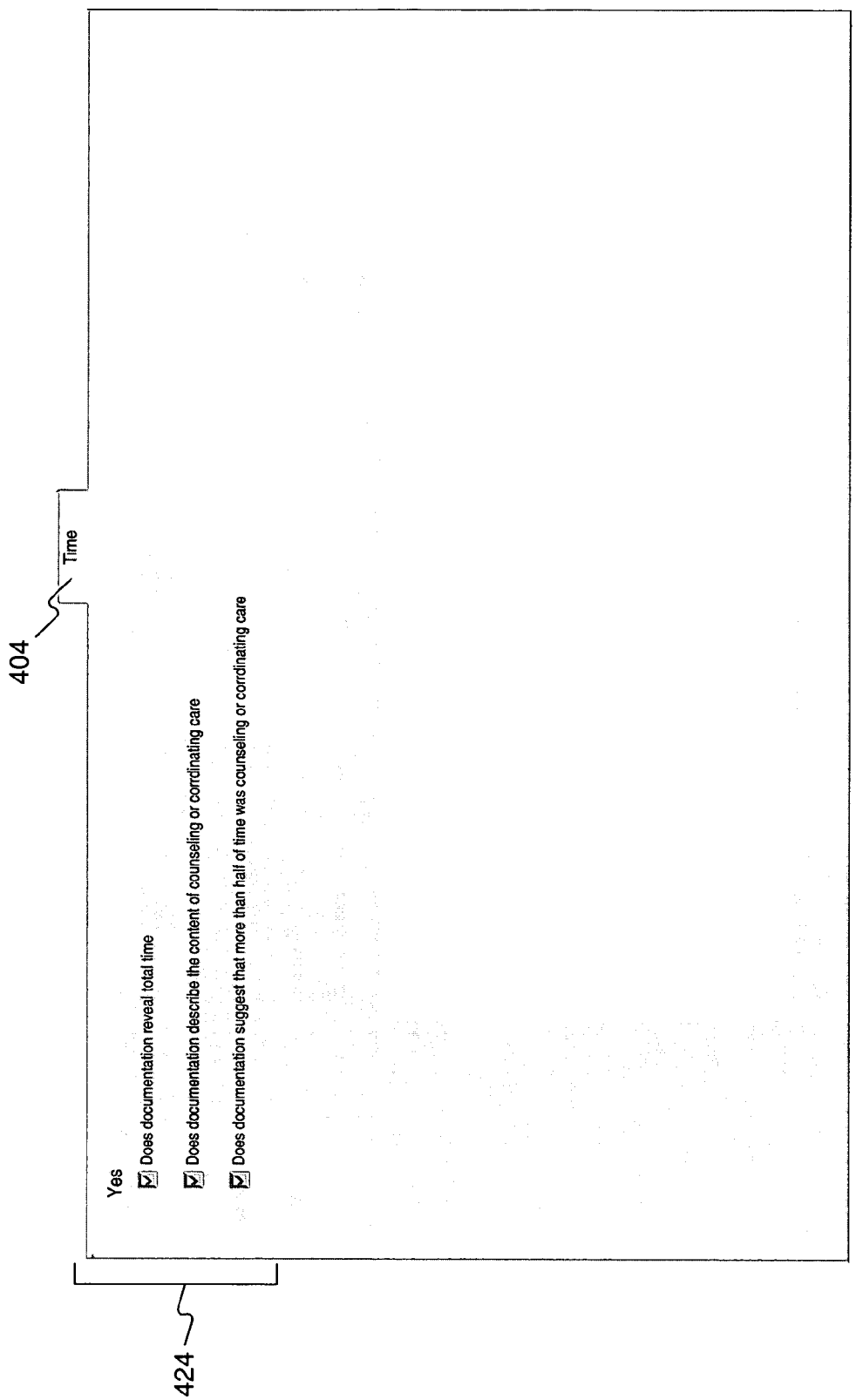

FIG. 12 shows features accessible from the main audit screen shown in FIG. 8 by selecting the "Medical Decision Making" tab 404. This screen includes data and entry fields 418 for Diagnosis and Management Options and Amount and Complexity of Data. FIG. 13 contains entry fields 420 for information required to document the Diagnosis and Management Options and Complexity of Data portions of the Medical Decision Making analysis. FIG. 13 shows features accessible from the main audit screen shown in FIG. 8 by selecting the "MDM Risk" tab 404, including data fields for presenting problems, diagnostic procedures, and management options. This data may be used to document the risk portion of the medical decision-making category. FIG. 14 shows features accessible from the main audit screen shown in FIG. 8 by selecting the "Notes" tab 404. FIG. 14 contains an entry field 422 for a user to store free-form notes about the audit. FIG. 15 shows features accessible from the main audit screen shown in FIG. 8 by selecting the "Time" tab. The "Time" screen shown in FIG. 15 may be used to document the necessary conditions 424 required for a claim to be based (i.e. audited) on time, if the audit is being conducted on a time basis.

Multiple audits may be performed for the same claim, for example, using different tabs and sub-tabs described above. Cycle times may be assigned at the claim level to determine the duration and required completion time of the individual tasks related to the processing of the audit. If tasks become overdue, they may be automatically escalated based on escalation rules. Activities related to the processing of audits may be logged by the user or automatically by the system. These activities have various attributes including but not limited to activity type, date, comment or note. Audit findings along with other status information may be communicated electronically or merged into letters to be sent to designated recipients, such as providers, clients, and insured individuals.

Litigation Manager

Systems consistent with the present invention may include a litigation manager to manage claims and groups of related claims (cases) that are slated for or involved in litigation. Under certain designated circumstances or in response to certain actions, litigation manager 500 may automatically refer claims or cases to an attorney. For example, Litigation Manager 500 may select one of a predetermined set of law firms and contact the selected firm when a set of conditions is met, such as identity of the parties, amount of the claim, etc.

Figure 16:
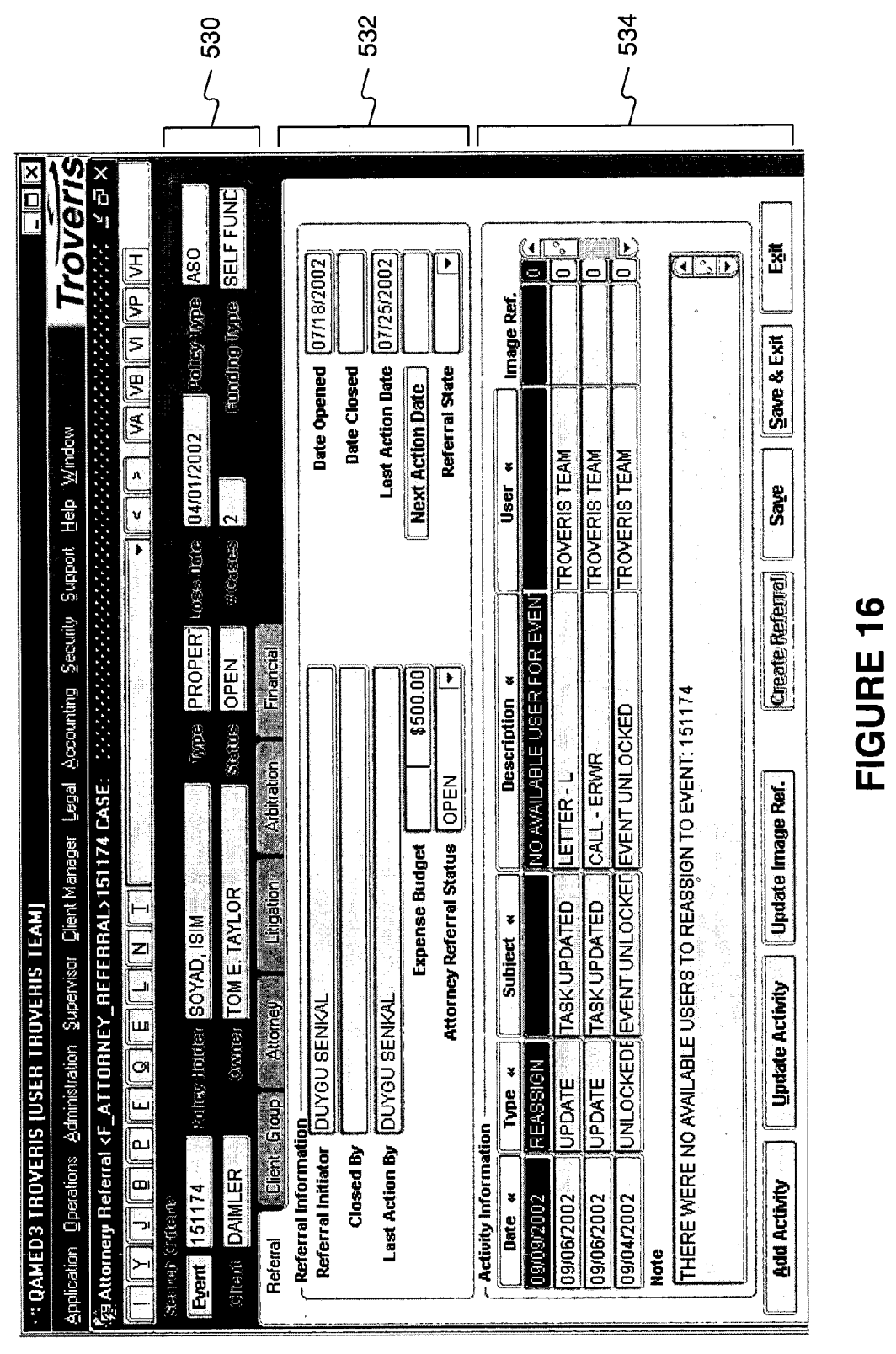

FIG. 16 is a screen shot of an attorney referral feature of a litigation manager according to an exemplary embodiment of the present invention. The upper portion 530 of FIG. 16 shows display/entry fields relating to information about a claim, such as an event number, policy holder, claim type (e.g., property), loss date, client, etc. The middle portion 532 of FIG. 16 shows display/entry fields relating to information about an attorney to which the claim or series of claims has been referred or assigned. This information includes the referral initiator, the expense budget for handling the referred claim, etc. The lower portion 534 shows activities taken with regard to the case and tasks to be completed. An activity or task refers to an action taken in litigating the claim, such as sending a letter, placing a phone call, etc. Each activity includes the date the activity was completed, the type of activity, the subject of the activity, a description of the activity, a user associated with the activity, and reference to any image related to the activity, such as an image of a letter.

Based on the claim data, litigation manager 500 may select an attorney in the appropriate jurisdiction with expertise in the area related to the claim. For example, if the claim data indicates that an injury occurred in Iowa and that the injury involved head trauma, the system selects an attorney in Iowa who specializes in subrogation and recovery in head trauma cases. Litigation manager 500 may then send claim or case information to the selected attorney, for example, electronically or in paper form.

Litigation manager 500 may create tasks for the attorney based on the type of case. The tasks may be created in consideration of previous actions in the case and tasks performed in similar cases that have already been processed. Tasks can also be created and edited by a user.

Figure 17:
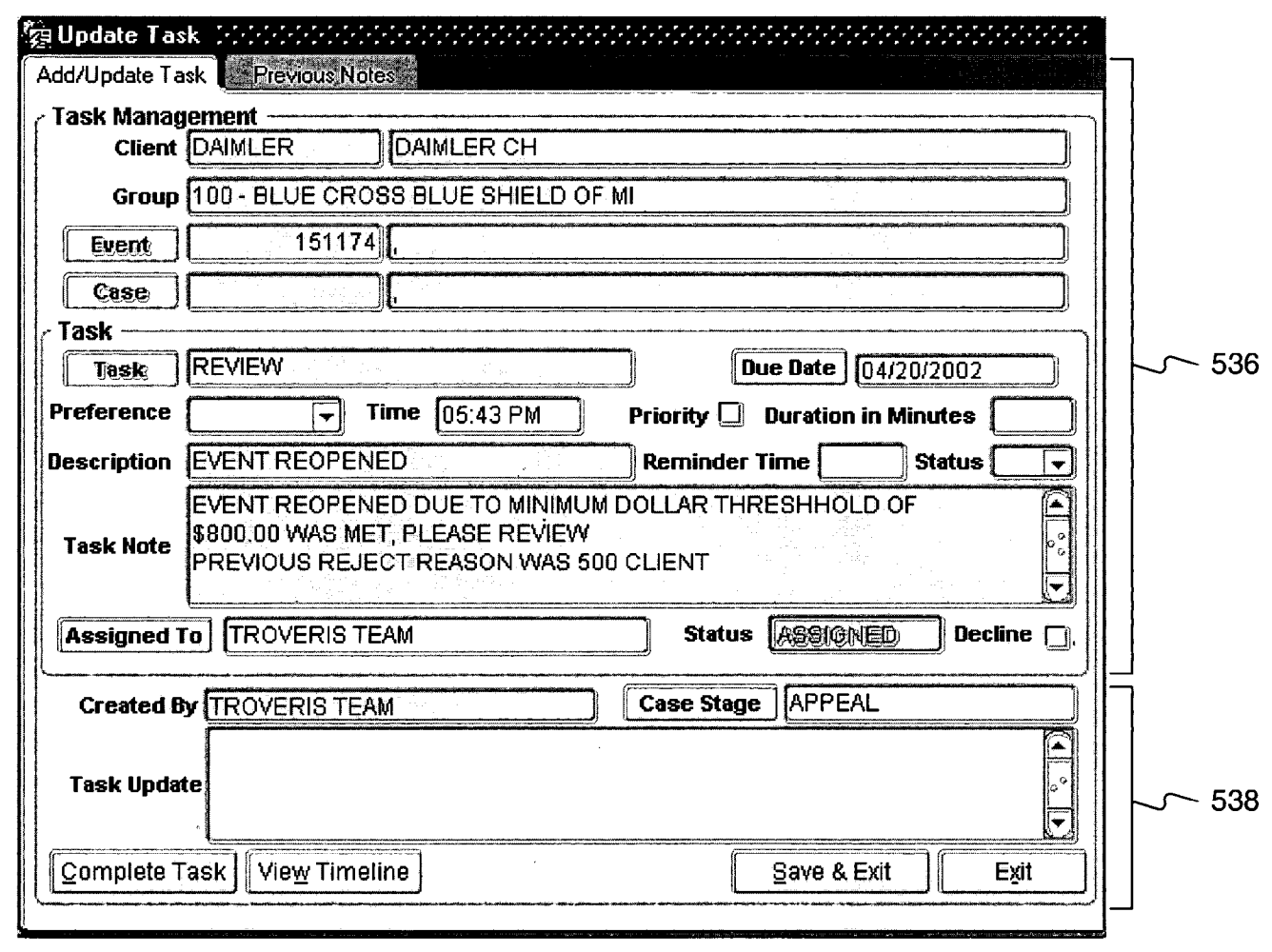

FIG. 17 is a screen shot of an exemplary task creation/update screen according to the present invention. This screen may include data entry fields 536 for client, group, event, number, case, number, task, and due date. In the lower portion 538 of this screen, a text box may enable a user to edit data such as the case stage (e.g., appeal) and task update.

Figure 18:
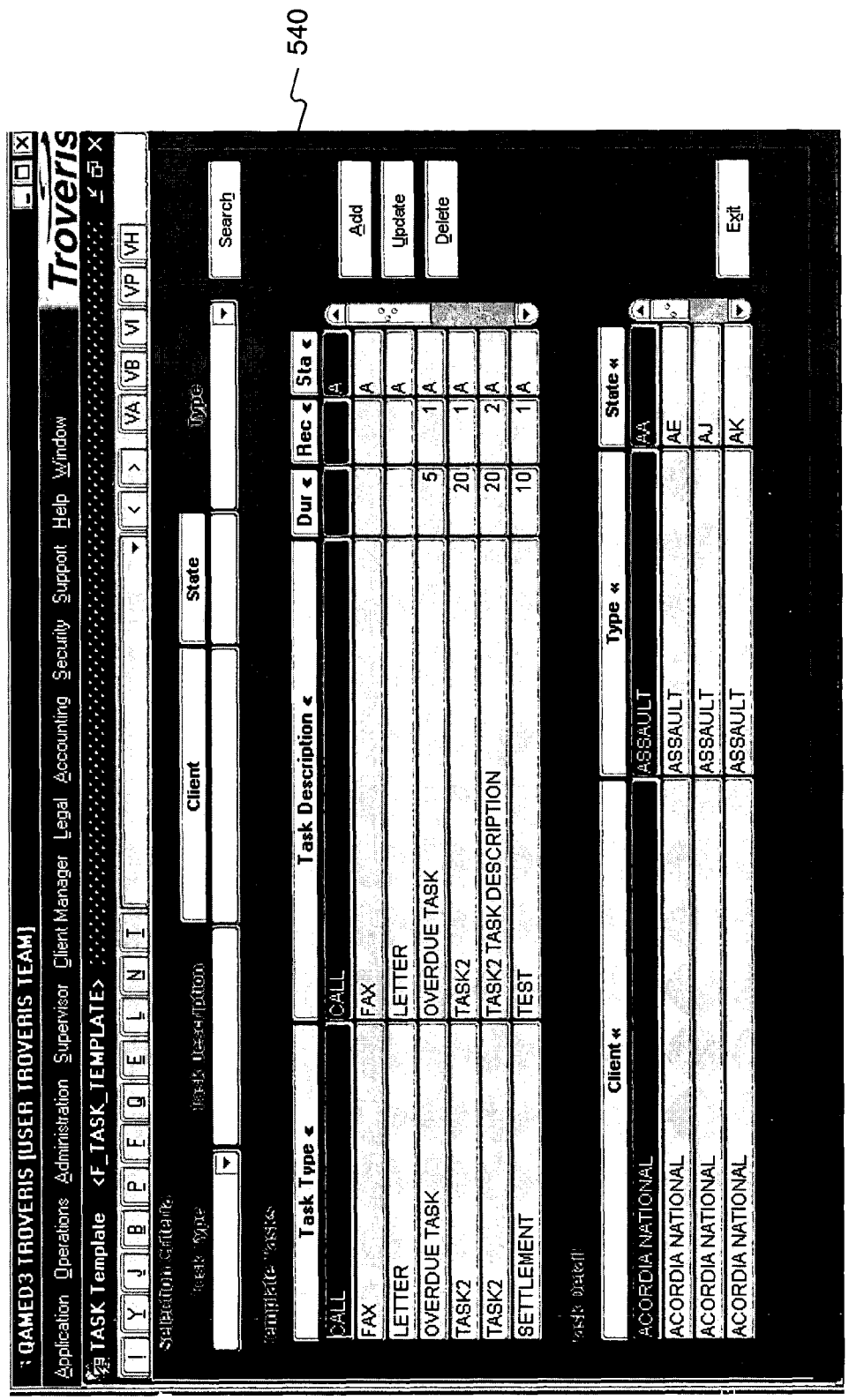

FIG. 18 is an exemplary screen shot 540 of a task template. Litigation manager 500 may enable a user and/or an attorney to create tasks by choosing, for example, a task type, task description, duration, and task detail.

Litigation manager 500 may prompt the attorney to perform particular tasks at specified times and record when each task is completed along with an outcome, if any. It may also prompt a non-attorney user to review a case involved in litigation and report on its status. For example, Litigation Manager 500 may note that a deadline for a task has passed, check to see if the task has been completed, and generate an e-mail message to the attorney if the task has not been completed.

Figure 19:
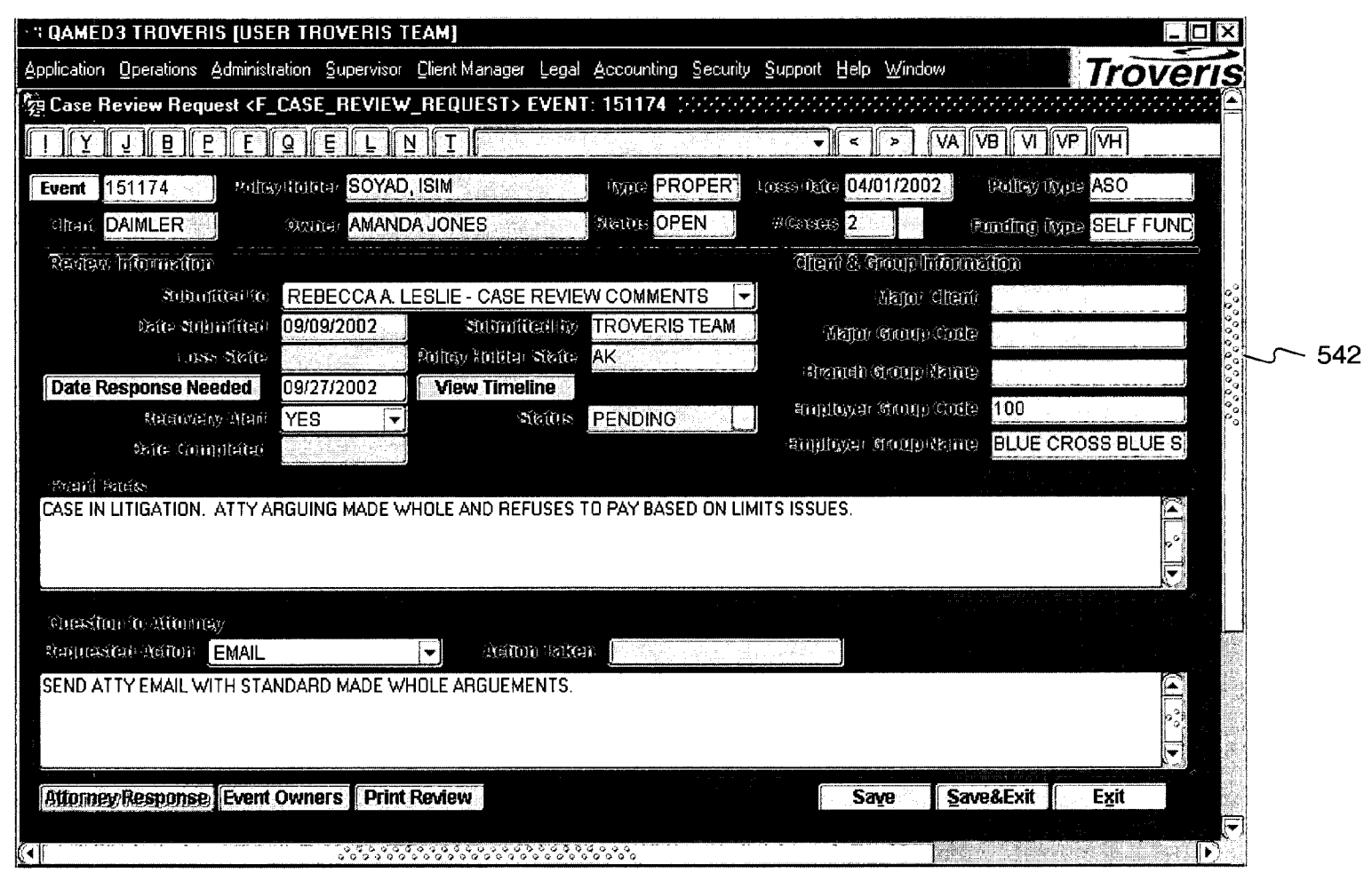

FIG. 19 is a screen shot 542 of a case review feature according to an exemplary embodiment of the present invention. FIG. 19 shows various display/entry fields for identifying a claim or series of claims being reviewed, including data such as event number, event facts, questions to attorney, etc. A user may review and report on tasks using a screen such as the one shown in FIG. 19.

Litigation manager 500 may also record and organize information about a litigation. FIGS. 20-23 are exemplary screen shots of the information organization feature of a litigation manager according to an exemplary embodiment of the present invention. For example, FIG. 20 includes display/entry fields 544 which identify a claim, such as the event number, the policy holder, and the loss date in addition to information about the client or employer group, such as the name and contact information for the client and the employer group, the threshold amount at which a claim is investigated, and the status of any information requests.

Figure 21:
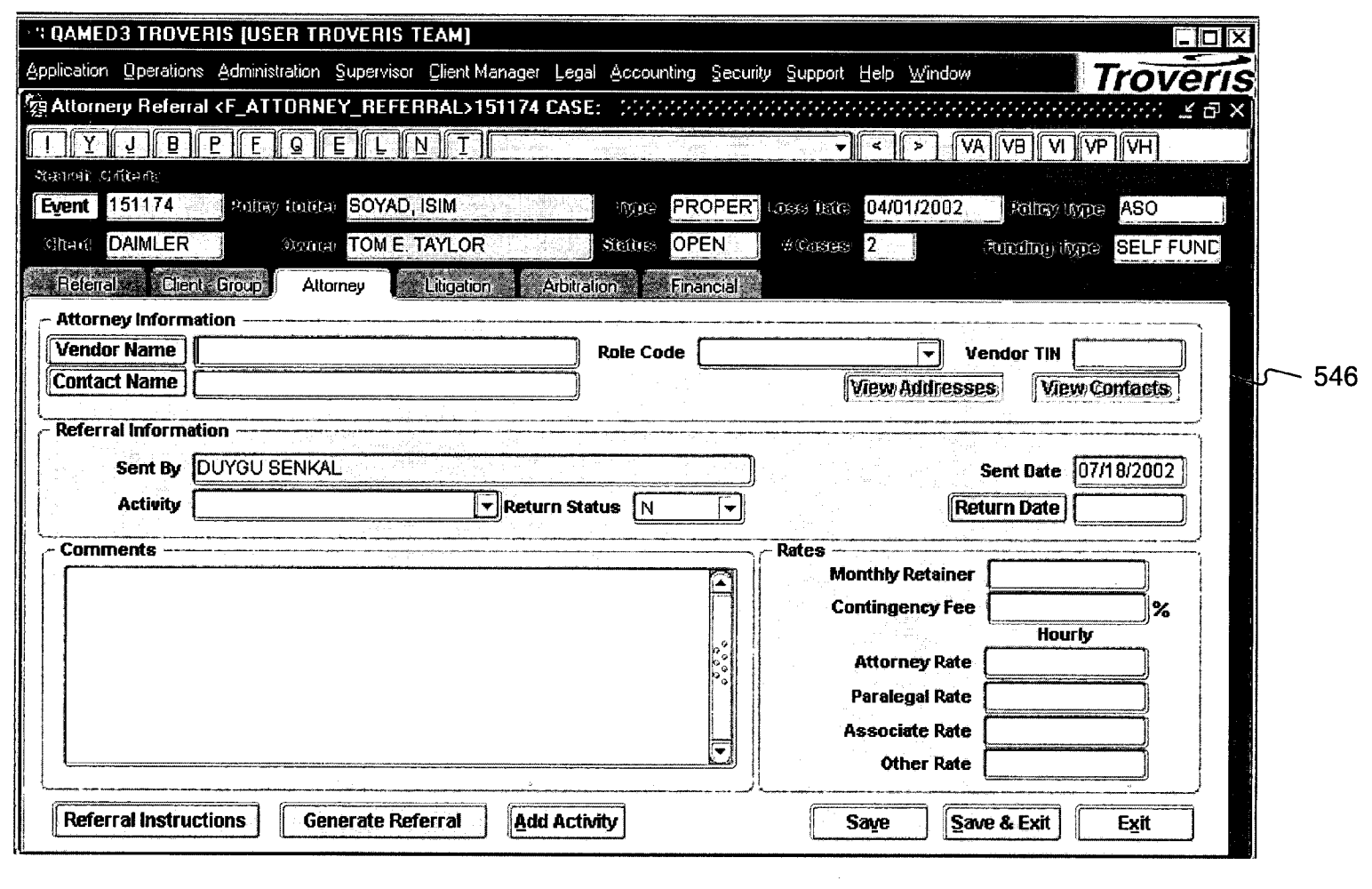

FIG. 21 includes information 546 about an attorney to which a case has been referred. The information may include the attorney name, contact information, information about the referral, the rates charged by the attorney, and any comments.

Figure 22:
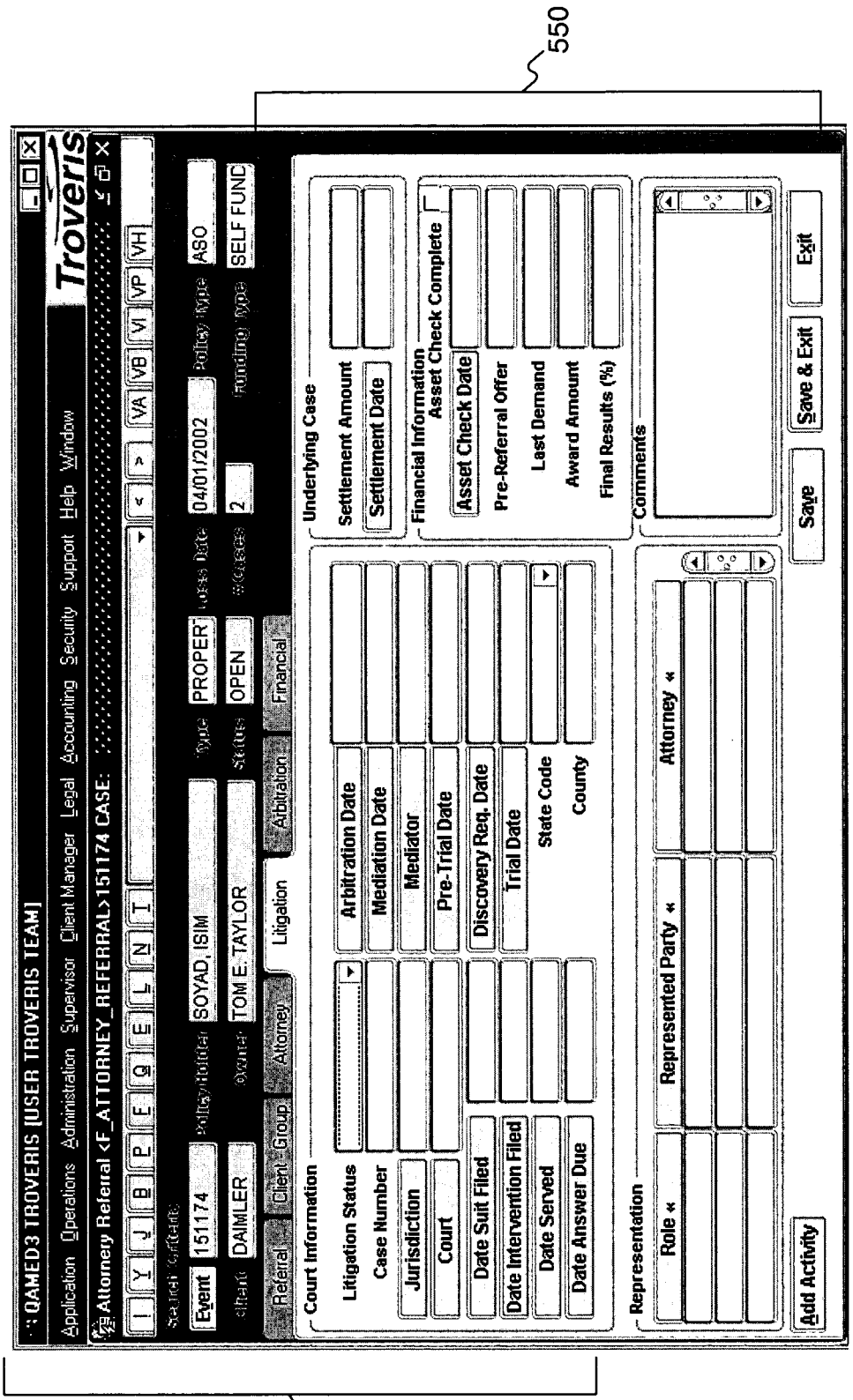

FIG. 22 includes entry and display fields 548 for various information about a litigation involving one or more related claims. The information includes court information such as the case number, the court, the legal jurisdiction, and various dates and deadlines associated with the litigation. There are also fields 550 relating to the parties, their roles, and their attorneys, including scheduling information, financial information about the case, any settlement information, and comments related to the litigation.

Figure 23:
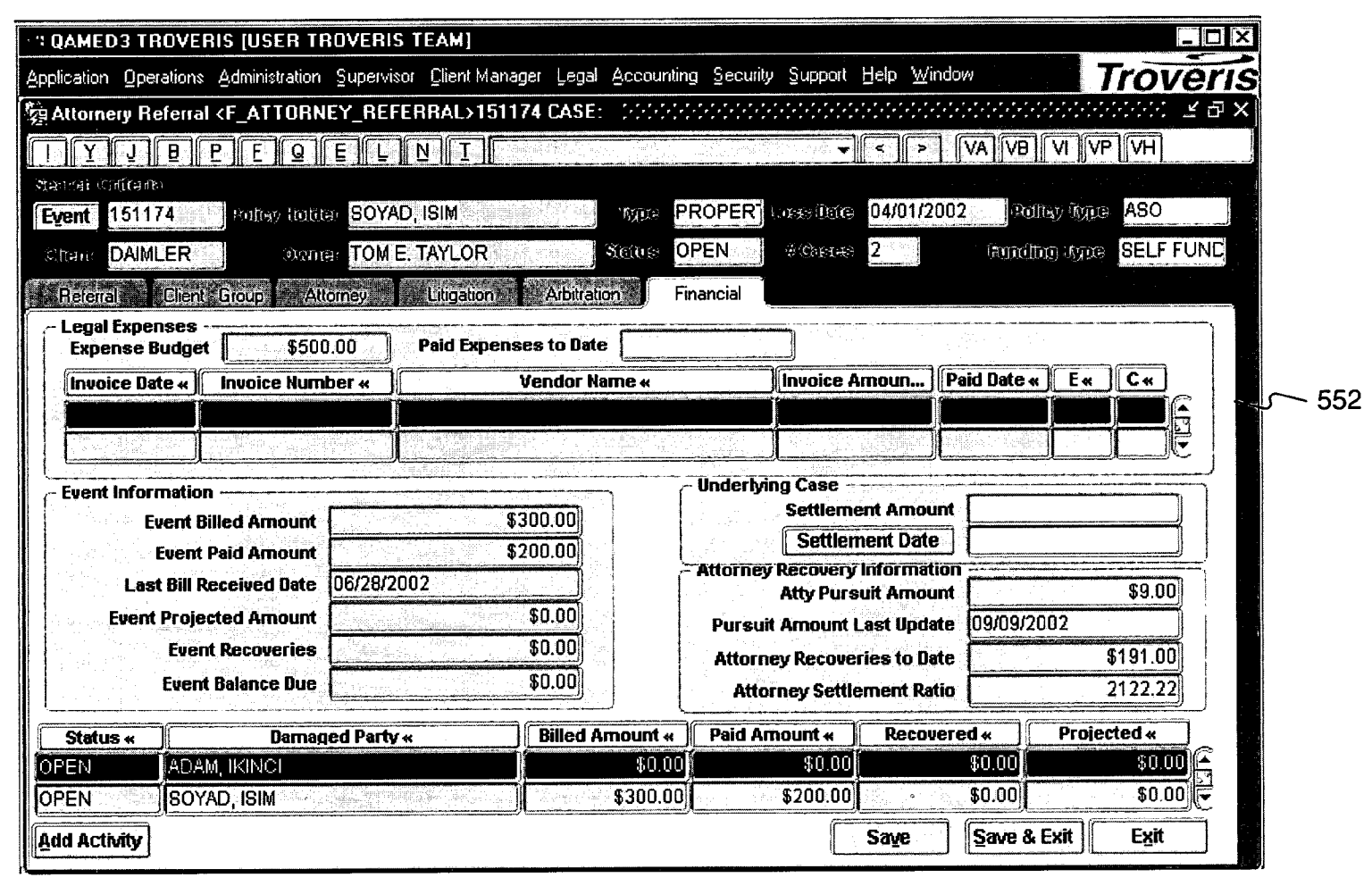

FIG. 23 includes display and entry fields 552 relating to financial information associated with the case. The financial information may include legal expenses, event information relating to the amount of the claim and the amount paid, information on any settlement, information about attorney recovery, etc.

Fees Calculation Module

When an insured individual submits a claim to an insurance company, for example, for payment of costs of treatment of an injury or repairs to damaged property, the insured individual may be required to subrogate their right to sue a third party responsible for the injury or property damage. This subrogation gives the insurance company the right to sue the third party. The insurance company may exercise that right, for example, by contracting with a service provider to attempt to recover funds on the claim. For instance, if an insured suffers a loss as a result of an auto accident caused by another party, the insured's insurance company may pay the insured's expenses related to the loss, and may later contract with a service provider to recover the cost of the expenses from the responsible party or from the responsible party's insurance company. In return for recovering the costs, a collection company or collector receives a fee, for example, a percentage of the amount recovered.

Fee arrangements between insurance companies and collectors can become quite complicated. For example, when a collector performs collection services for an insurance company, the collector may calculate and pay any applicable taxes due to the insurance company's state. The collector may also retain a portion of the amount recovered as its fee for the collection services. The balance of the recovery is typically remitted to the insurance company.

A single collector may serve a plurality of clients, i.e., insurance companies and/or other entities needing collection services. This means the collector may deal with multiple states and multiple state tax laws. Furthermore, each client may have a different contract with different fee arrangements with the collector. Systems consistent with the present invention manage multiple fee calculations, including multiple states, multiple tax laws, and multiple fee arrangements. Even within a single client, there may be multiple fee contracts. For example, a client may have a very complex corporate structure.

Figure 24:
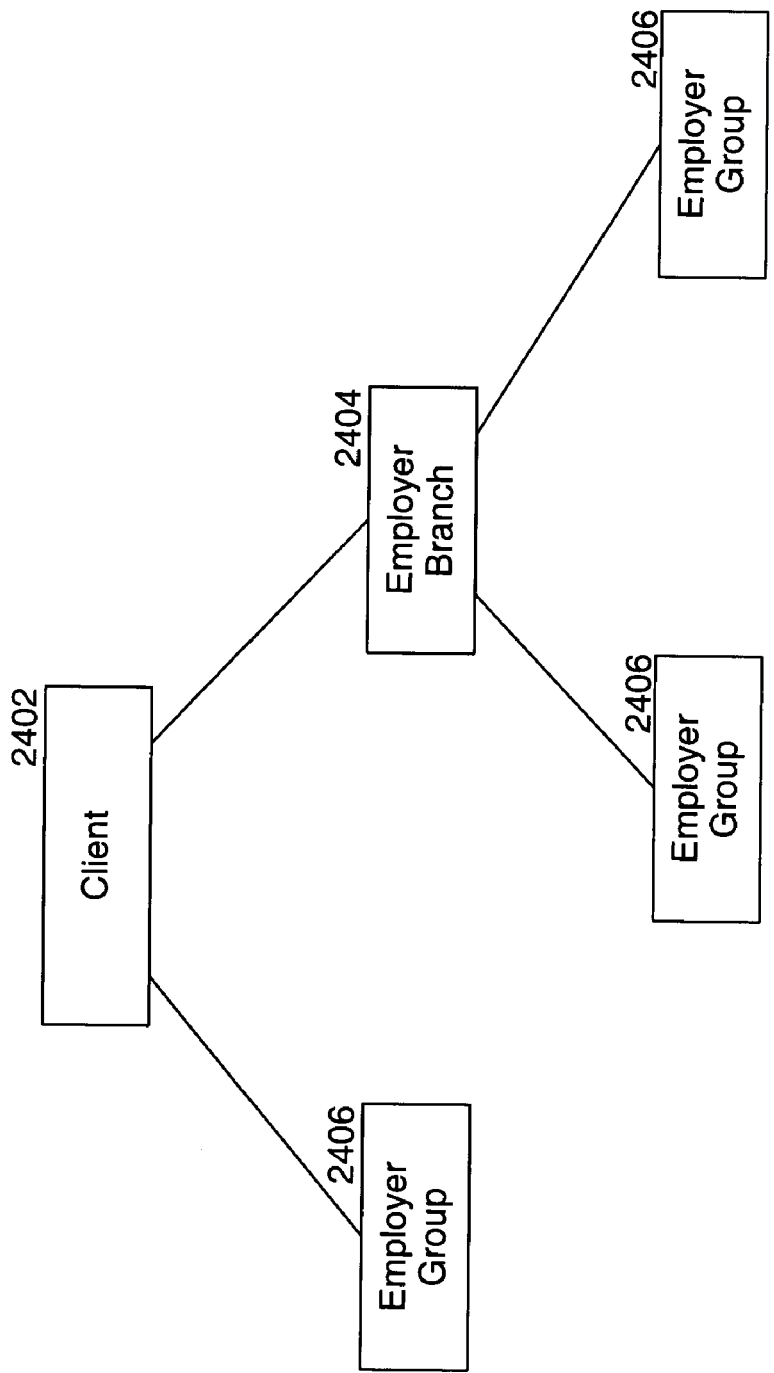
FIG. 24 is a block diagram of an organizational structure of an exemplary insurance company.

FIG. 24 is a block diagram of an exemplary client 2402 that contracts with a collector for recovery services. Within client 2402 are sub-groups or subsidiaries including employer branch 2404 and employer group 2406. Employer branch 404 may further include additional employer groups 2406. Each employer group and/or employer branch may have its own contract with a collector (not shown) in addition to an overall contract between the collector and client 2402. Thus, a single claim related to one employer group 2406 may implicate multiple contracts involving the employer group, an employer branch, and the client itself. Systems consistent with the present invention manage multiple fee contracts among multiple parties even within a single client.

Figure 25:
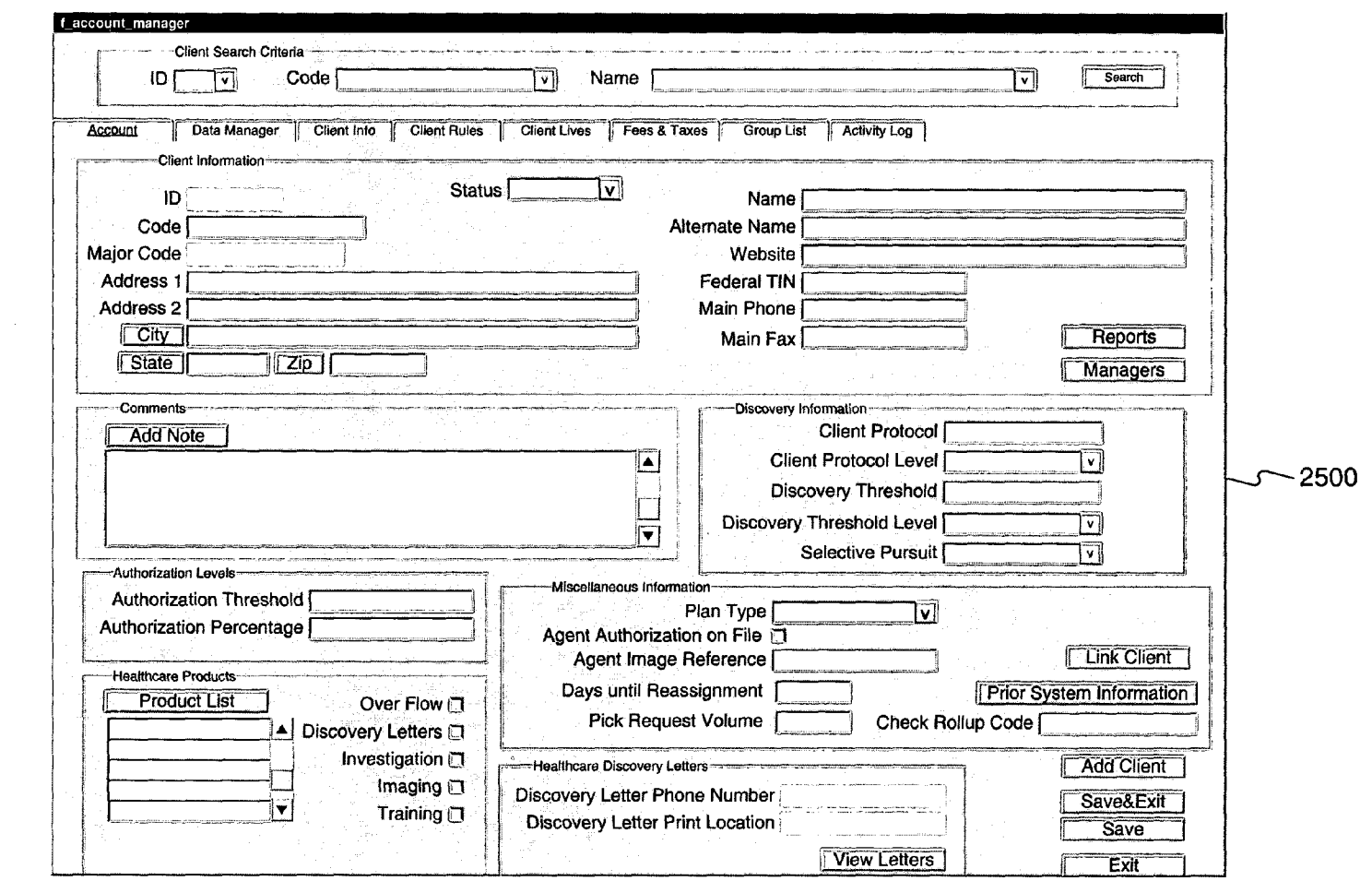

FIG. 25 is an exemplary screen shot 2500 of a user interface for managing client information consistent with an embodiment of fees calculation module 600. With this user interface, a user may search for a client using an ID, code, or name. The user may manage client information such as ID, code, name, address, telephone, fax, website, and contact person name. User interface 2500 may enable the user to manage all manner of information about a client, including discovery information, authorization levels, healthcare products, healthcare discovery letters, and miscellaneous information.

Figure 26:
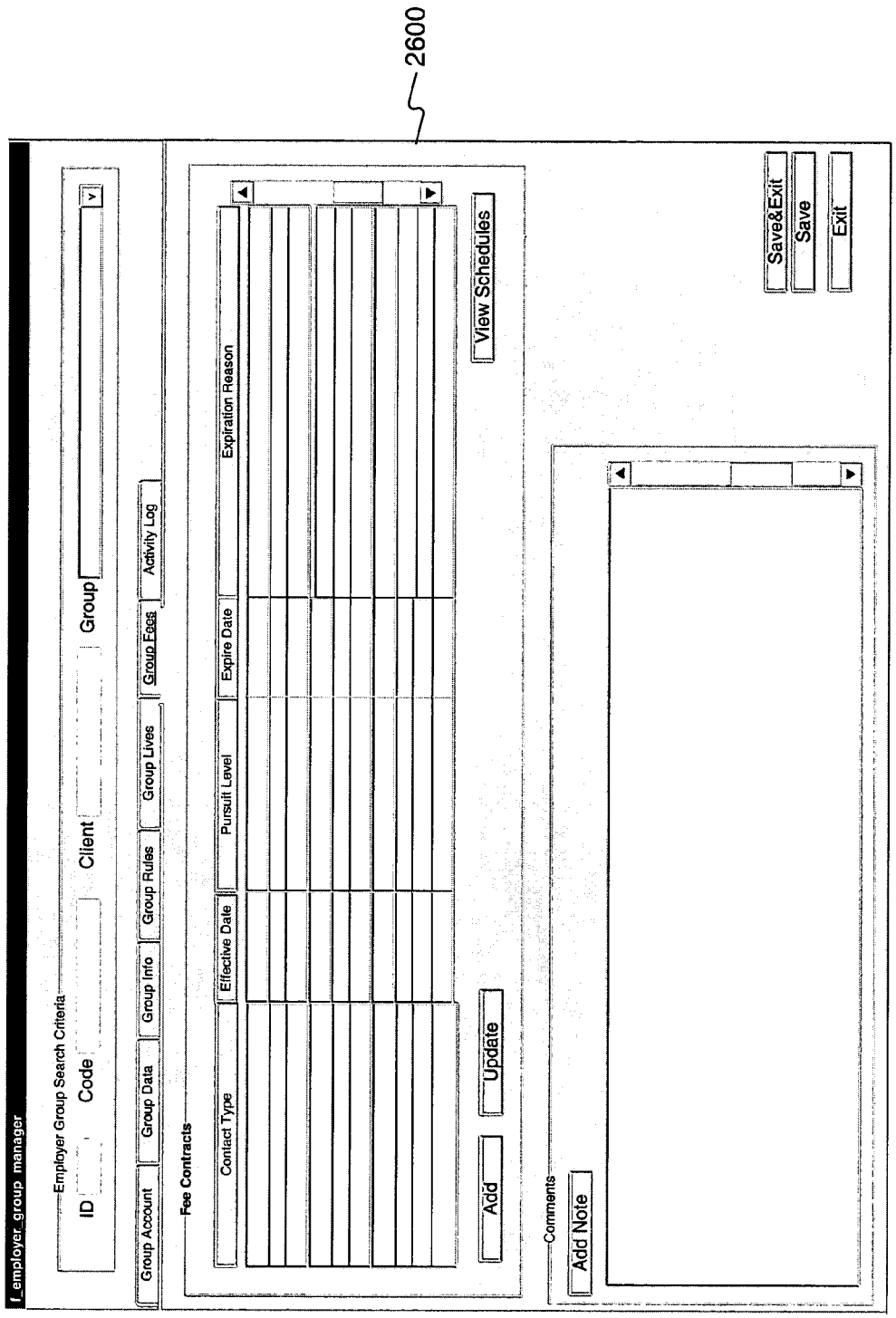

FIG. 26 is an exemplary screen shot of a user interface 2600 for managing client fee information consistent with an embodiment of fees calculation module 600. With user interface 2600, a user may search for a client using an ID, code, or name. For a client, the fee information user interface includes a list of fee contracts, including data such as contract type, effective date, pursuit level, expire date, and expiration reason. A contract type may represent a pricing model, such as traditional medical, traditional recovery, split-fee recovery, performance-based, flexible based recovery, and flexible-based medical. A pursuit level code may describe the amount of work required or authorized to pursue subrogation. For example, a pursuit level may be "fast track" if third party liability has already been identified by the first party carrier, "arbitration," or "litigation. Fees calculation module 600 may ensure that a recovery date falls between the effective date (i.e., the date the contract begins) and the expire date (i.e., the date the contract ends) before calculating appropriate fees.

User interface 2600 may also include tax rules applicable to the client, including tax codes and tax rates, etc. A fee schedule accessible from the user interface may include, for example, a fee percentage, administrative fees, who is responsible for paying legal fees, etc. Fees calculation module 600 may use the fee schedule and tax rules to determine fees collected based on recovery of a claim.

In an embodiment of the present invention, fees calculation module 600 may enforce user-established precedence rules in cases where multiple contracts apply to a recovery. For example, employer group-based contracts may take precedence over client-based contracts. If a client's fee schedule indicates performance-based pricing, then all groups under that client might use the client's results for pricing. Alternatively, employer groups with different fee schedules would not apply the client's pricing result in some cases. Fees calculation module 600 provides the user with flexibility to determine these rules.

Legal Database

Systems consistent with the present invention may include a legal database 700 including, for example, a collection of federal, state, and local laws that may affect payment, subrogation, and recovery related to insurance claims. The database may be accessed and searched by a user, such as an auditor at an insurance company or an employee of a service provider such as a collector.

Figure 27:
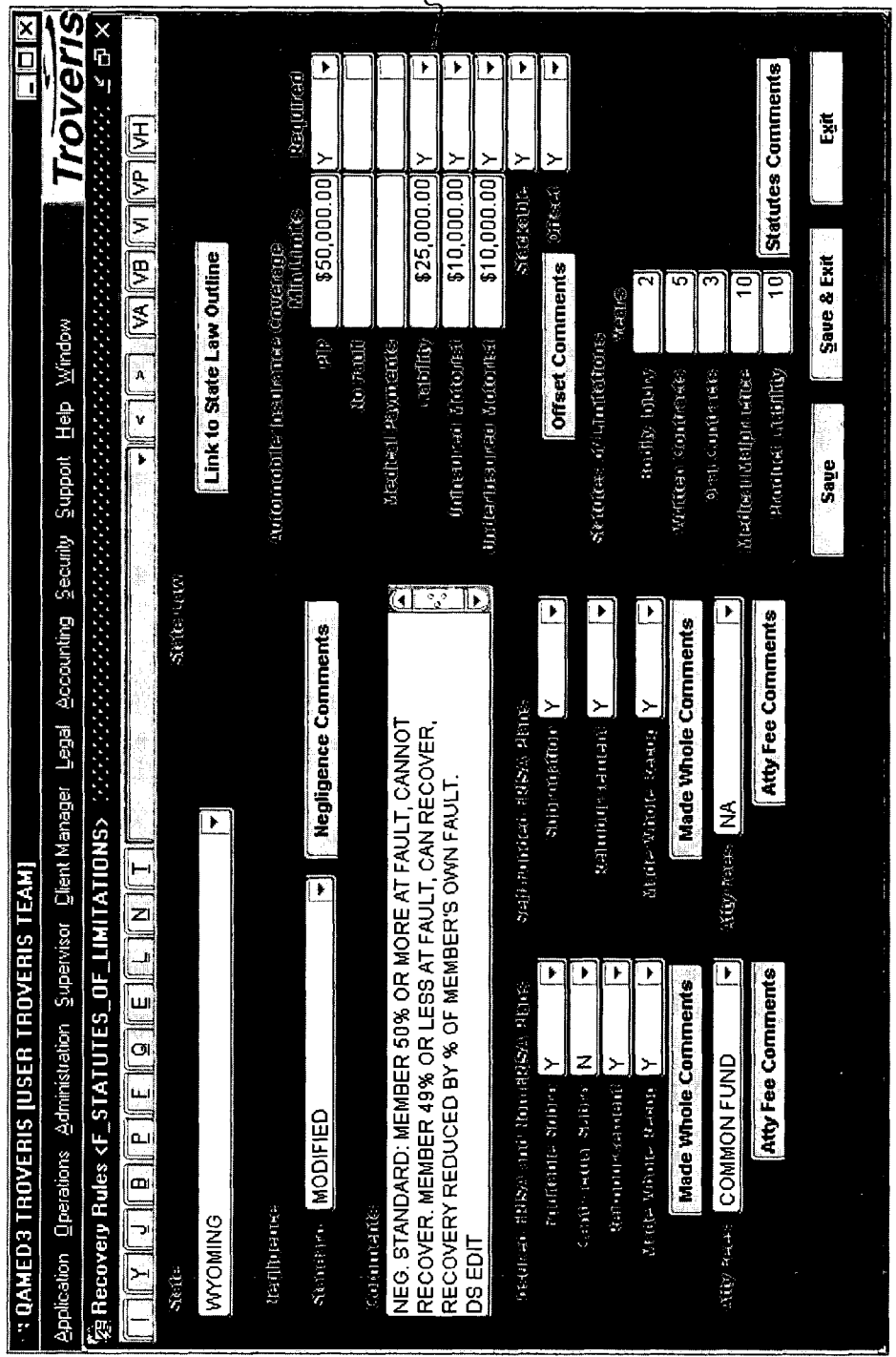
FIG. 27 is a block diagram of a legal database according to an exemplary embodiment of the present invention.

FIG. 27 is a screen shot 2700 of an exemplary user interface for legal database 700. A user may select the state of interest, and legal database 700 may then display various legal information such as statutes of limitation, negligence standards, comments about the laws of the state, subrogation rules for Insured ERISA and Non-ERISA plans and self-funded ERISA plans, etc., that arise under the laws of the selected state. User interface 2700 also shows link buttons that, when activated, may provide access to other features and information not shown, such as a state law outline.

Legal database 700 may be used as a tool by various modules and applications within server 10 to make decisions and carry out tasks. For example, the investigation portion of prepayment module 300 may utilize legal database 700 to generate a template of information that must be gathered to process the claim. For instance, a particular state may have a limit on recovery for accidents involving vehicles over a certain weight limit. During investigation of a claim in the particular state, prepayment module 300 may request all laws relevant to recovery in that state from legal database 700. Prepayment module 300 may then recognize that the weight of the vehicles involved will be important in processing the claim. As a result, the template generated for investigation of that claim will include requests for information about the weight of vehicles involved in an accident.

Legal database 700 may also be used to determine whether a particular claim has subrogation potential. For example, first party recovery is not available in some jurisdictions, such as Michigan. Using this information from legal database 700, prepayment module 300 can determine that cases involving first party recovery in Michigan have no subrogation potential. Legal database 700 may also contain information on recovery caps. For example, some jurisdictions may have statutorily imposed limits on recovery. Prepayment module 300 may utilize this information when calculating an expected recovery.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A computer-implemented method for managing insurance claims, comprising the steps, performed by a computer, of:

receiving data related to an insurance claim via a network;

determining whether the insurance claim has recovery potential by using the received data to compare a value of the insurance claim with a threshold amount, wherein the insurance claim is determined to have a recovery potential when the value is greater than the threshold amount;

if it is determined that the insurance claim has recovery potential, providing a characteristic of the insurance claim, and automatically evaluating the characteristic of the insurance claim;

searching a client database to determine if other claims exist for an insured individual associated with the claim;

delaying payment pending investigation based on a determination that no other claim exists for the insured individual; and establishing a payment decision for the insurance claim based on at least one of the received data and the evaluation of the characteristic.

2. The method of claim 1, wherein the data related to the insurance claim includes at least one of a treatment code, a provider, and a claim value.

3. The method of claim 1, wherein the providing step further includes:

determining whether a related insurance claim has been received.

4. The method of claim 1, wherein the providing step further includes:

determining whether a worker's compensation claim corresponding to the insurance claim has been accepted.

5. The method of claim 1, wherein the providing step further includes:

determining whether first party insurance coverage corresponding to the insurance claim is available.

6. The method of claim 1, wherein the determining step further includes:

applying weights to specified portions of the data related to the insurance claim to obtain weighted values;

adding the weighted values to obtain a result;

comparing the result to a likely recovery value; and determining that the insurance claim has recovery potential when the result is above the likely recovery value.

7. A system for managing insurance claims, comprising:

a receiving component configured to receive data related to an insurance claim via a network;

a determining component configured to determine whether the insurance claim has recovery potential by using the received data to compare a value of the insurance claim with a threshold amount, wherein the insurance claim is determined to have a recovery potential when the value is greater than the threshold amount;

a providing component configured to provide a characteristic of the insurance claim and to automatically evaluate the characteristic, if the determining component determines that the insurance claim has recovery potential; a searching component for searching a client database to determine if other claims exist for an insured individual associated with the claim;

an investigation component for delaying payment pending investigation based on a determination that no other claim exists for the insured individual; and an establishing component configured to establish a payment decision for the insurance claim based on at least one of the received data and the evaluation of the characteristic.

8. The system of claim 7, wherein the data related to the insurance claim includes at least one of a treatment code, a provider, and a claim value.

9. The system of claim 7, wherein the providing component further includes:
a determining component configured to determine whether a related insurance claim has been received.

10. The system of claim 7, wherein the providing component further includes:
a determining component configured to determine whether a worker's compensation claim corresponding to the insurance claim has been accepted.

11. The system of claim 7, wherein the providing component further includes:
a determining component configured to determine whether first party insurance coverage corresponding to the insurance claim is available.

12. The system of claim 7, wherein the determining component further includes:
an applying component configured to apply weights to specified portions of the data related to the insurance claim to obtain weighted values;
an adding component configured to add the weighted values to obtain a result;
a comparing component configured to compare the result to a likely recovery value; and
a determining component configured to determine that the insurance claim has recovery potential when the result is above the likely recovery value.

13. A system for managing insurance claims, comprising:
means for receiving data related to an insurance claim via a network;
means for determining whether the insurance claim has recovery potential by using the received data to compare a value of the insurance claim with a threshold amount, wherein the insurance claim is determined to have a recovery potential when the value is greater than the threshold amount;
means for providing a characteristic of the insurance claim, and automatically evaluating the characteristic of the insurance claim, if it is determined that the insurance claim has recovery potential;
means for searching a client database to determine if other claims exist for an insured individual associated with the claim;
means for delaying payment pending investigation based on a determination that no other claim exists for the insured individual; and
means for establishing a payment decision for the insurance claim based on at least one of the received data and the evaluation of the characteristic.

14. A computer-usable storage medium having computer-readable code embodied therein for managing insurance claims, the computer-readable code comprising:
a receiving module configured to receive data related to an insurance claim via a network;
a determining module configured to determine whether the insurance claim has recovery potential by using the received data to compare a value of the insurance claim with a threshold amount, wherein the
insurance claim is determined to have a recovery potential when the value is greater than the threshold amount;
a providing module configured to provide a characteristic of the insurance claim and automatically evaluate the characteristic of the insurance claim, if it is determined that the insurance claim has recovery potential;
a searching module for searching a client database to determine if other claims exist for an insured individual associated with the claim;
an investigation module for delaying payment pending investigation based on a determination that no other claim exists for the insured individual; and
an establishing module configured to establish a payment decision for the insurance claim based on at least one of the received data and the evaluation of the characteristic.

* * * * *